US012748200B2

(12) United States Patent
Zhou et al.

(10) Patent No.: US 12,748,200 B2
(45) Date of Patent: Sep. 29, 2026

(54) LIGHT SOURCE CHARACTERIZATION SYSTEM

(71) Applicant: Motional AD LLC, Boston, MA (US)

(72) Inventors: Yong Zhou, New Kensington, PA (US); Geng Fu, Belmont, MA (US)

(73) Assignee: Motional AD LLC, Boston, MA (US)

(*) Notice: Subject to any disclaimer, the term of this patent is extended or adjusted under 35 U.S.C. 154(b) by 1220 days.

(21) Appl. No.: 17/566,153

(22) Filed: Dec. 30, 2021

(65) Prior Publication Data

US 2023/0213632 A1 Jul. 6, 2023

(51) Int. Cl.

*G01S 7/497* (2006.01)
*G01S 7/481* (2006.01)

(52) U.S. Cl.

CPC .......... *G01S 7/4972* (2013.01); *G01S 7/4813* (2013.01)

(58) Field of Classification Search

CPC ...... G01S 7/4817; G01S 7/4813; G01S 7/481; G01S 7/4972; G02B 5/005; G02B 26/0816; G02B 26/10

See application file for complete search history.

(56) References Cited

U.S. PATENT DOCUMENTS

| | | | | |
|---|---|---|---|---|
| 4,588,887 A * | 5/1986 | Bailey | H04N 1/1135 250/236 |
| 6,094,258 A * | 7/2000 | Abe | G01S 7/4817 359/601 |
| 6,118,118 A * | 9/2000 | van der Lely | G01S 17/06 250/221 |
| 8,836,922 B1 * | 9/2014 | Pennecot | G01S 17/42 356/9 |
| 9,425,654 B2 * | 8/2016 | Lenius | B60L 8/003 |
| 9,618,615 B2 * | 4/2017 | Inada | G01S 13/931 |
| 10,012,723 B2 * | 7/2018 | Lindskog | G01S 7/4813 |
| 11,480,707 B2 * | 10/2022 | Steinkogler | G01V 8/18 |
| 11,493,922 B1 * | 11/2022 | Avram | B60W 60/001 |
| 11,874,399 B2 * | 1/2024 | Shin | H04B 1/38 |
| 11,897,397 B2 * | 2/2024 | Chung | G01S 7/4813 |
| 12,019,187 B2 * | 6/2024 | Xiang | G02B 27/1086 |
| 12,055,661 B2 * | 8/2024 | Xiang | G02B 26/105 |
| 12,153,163 B2 * | 11/2024 | Donovan | G01S 17/87 |
| 12,399,262 B2 * | 8/2025 | Verghese | G01S 7/4868 |

(Continued)

FOREIGN PATENT DOCUMENTS

| | | |
|---|---|---|
| EP | 2950115 A1 | 12/2015 |
| JP | 10-002790 A | 1/1998 |

(Continued)

OTHER PUBLICATIONS

Great Britain Office Action issued for Application No. GB 2219803.0, dated Jun. 15, 2023.

(Continued)

*Primary Examiner* — Wyatt A Stoffa

(74) *Attorney, Agent, or Firm* — Knobbe, Martens, Olson & Bear, LLP

(57) ABSTRACT

Various measurement systems and methods are disclosed to enable characterizing the optical characteristics of light beams emitted by a light detection and range finding (LIDAR) system or sensor and evaluating the range finding function of user selected lidar channels while the lidar operates under a real operational condition and is exposed to a range of user defined environmental conditions.

23 Claims, 13 Drawing Sheets

(56) References Cited

U.S. PATENT DOCUMENTS

| | | | | |
|---|---|---|---|---|
| 12,466,427 | B2 * | 11/2025 | Teo | G01S 13/931 |
| 2001/0046133 | A1 * | 11/2001 | Ramer | G01S 17/42 362/343 |
| 2002/0152963 | A1 * | 10/2002 | Vijverberg | G02B 26/12 119/14.08 |
| 2005/0201096 | A1 * | 9/2005 | Terui | G01S 7/4812 362/276 |
| 2012/0170029 | A1 * | 7/2012 | Azzazy | G01S 17/66 356/139.04 |
| 2014/0111812 | A1 * | 4/2014 | Baeg | G01S 17/87 356/610 |
| 2019/0052844 | A1 * | 2/2019 | Droz | G01S 17/931 |
| 2019/0250250 | A1 * | 8/2019 | Hayashi | G01S 7/487 |
| 2019/0324121 | A1 * | 10/2019 | Bösch | G02B 7/14 |
| 2019/0361119 | A1 * | 11/2019 | Kim | G01S 17/08 |
| 2019/0369256 | A1 * | 12/2019 | Shotan | G01S 7/4972 |
| 2021/0278505 | A1 * | 9/2021 | Pacala | G01S 7/4863 |
| 2022/0043121 | A1 | 2/2022 | Gilbergs et al. | |
| 2022/0057519 | A1 | 2/2022 | Goldstein et al. | |
| 2022/0229158 | A1 | 7/2022 | Ye et al. | |
| 2022/0268896 | A1 * | 8/2022 | Ueno | G01S 7/497 |
| 2022/0365190 | A1 * | 11/2022 | Nathan | G01S 7/4817 |
| 2023/0213629 | A1 * | 7/2023 | Zhou | G01S 7/4814 356/4.01 |
| 2023/0213632 | A1 * | 7/2023 | Zhou | G01S 7/4813 356/5.01 |
| 2023/0221412 | A1 | 7/2023 | Moon | |
| 2024/0085530 | A1 * | 3/2024 | Droz | G01S 7/4813 |

FOREIGN PATENT DOCUMENTS

| | | | |
|---|---|---|---|
| JP | 2010-002790 | A | 1/2010 |
| WO | WO 2017/104904 | A1 | 6/2017 |
| WO | WO 2019/121435 | A1 | 6/2019 |

OTHER PUBLICATIONS

Korean Office Action issued for Application No. KR 10-2022-0187094, dated Oct. 14, 2024.

* cited by examiner

200

200

200

200

LIGHT SOURCE CHARACTERIZATION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Light Detection and Ranging (LIDAR) devices use light beams to detect object in environment surrounding the LIDAR and determine their distance from LIDAR.

DETAILED DESCRIPTION

Figures 1A, 1B, 1C:
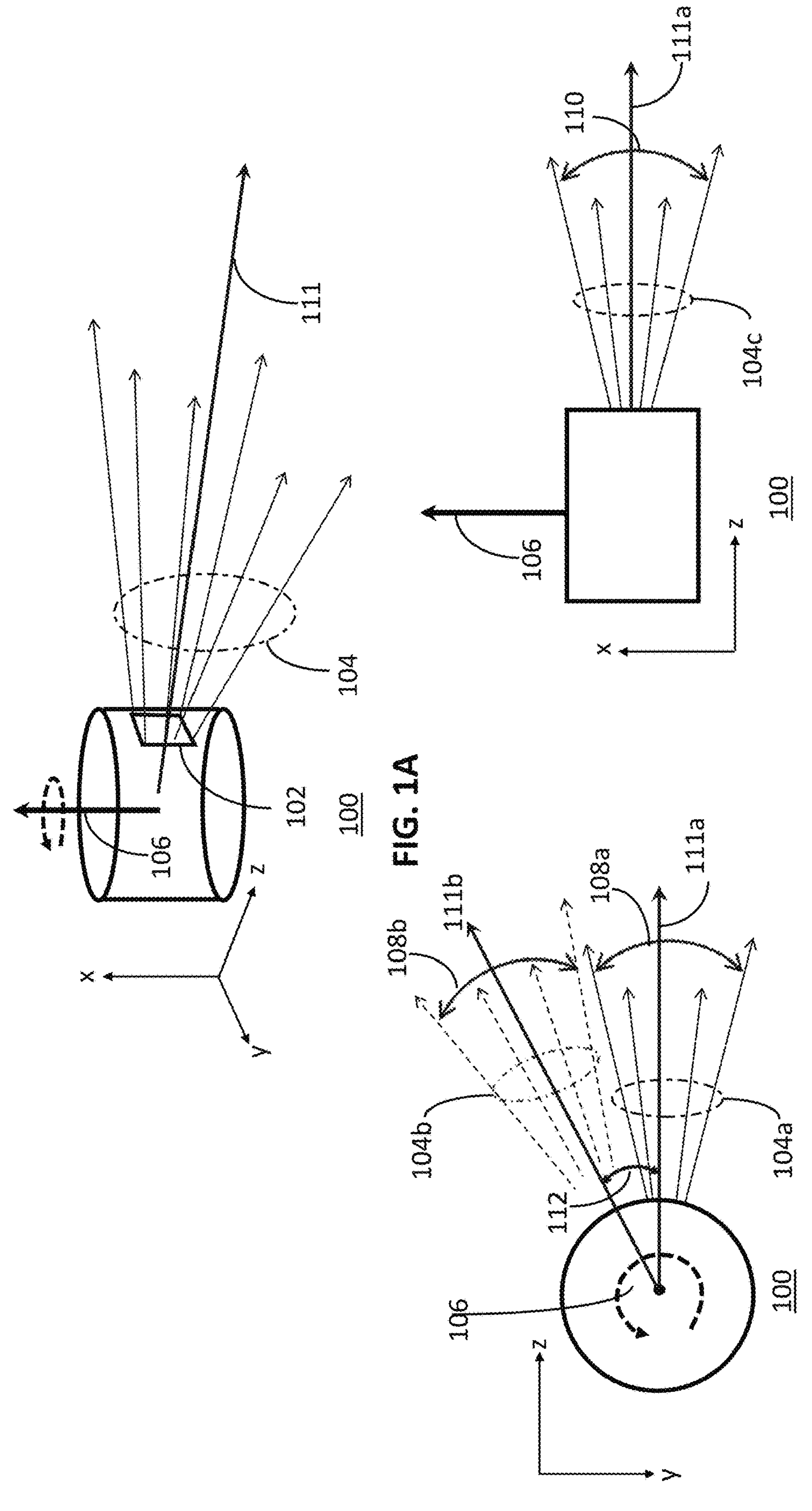
FIGS. 1A-1F are diagrams illustrating various views and components of example lidar devices emitting a plurality of light beams.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Lidar Measurement System Overview

Self-driving vehicles preferably include highly accurate and reliable sensors to detect objects, and calculate their distances from the vehicle. Among various technologies developed for object detection and ranging, laser-based range finders are often used for autonomous driving systems due to their high resolution and accuracy. Laser based range finders or laser range finders are sometimes called Light Detection and Ranging (LIDAR) or Laser Detection and Ranging (LADAR).

In some cases, a lidar may detect an object and determine a distance between the object and the lidar by illuminating the object with an incident optical signal and measuring a delay between generation of the optical signals and reception of the corresponding reflected optical signal reflected by the object. In some cases, the incident optical signal may comprise a temporal variation of an optical characteristic (e.g., amplitude, phases, frequency, polarization) of a light beam emitted by the lidar. In some examples, a light beam may comprise a laser beam generated by a laser source. In some cases, a laser beam may comprise a light having wavelengths within a narrow linewidth centered around a laser wavelength. For example, the optical signal can be a laser pulse (e.g., a sudden variation of laser intensity) and the lidar may determine the distance from the object by measuring a delay or time-of-flight (ToF) between the transmission of incident laser pulse, and reception of the corresponding reflected laser pulse. In some cases, lidars that determine the distance from the objects based on the time-of-flight of a laser pulse may be referred to as ToF lidars.

In certain cases, the light beam emitted by a lidar may comprise a continuous wave (CW) light beam modulated by a radio frequency (RF) signal, and the optical signal may comprise a variation of the modulation frequency, amplitude or phase. In some cases, a variation of the phase or frequency of a CW light beam may be used to determine a distance between the lidar and a target.

In some cases, to control and guide an autonomous vehicle in a complex driving environment, a lidar can continuously scan the environment surrounding the vehicle with a relatively high scanning speed to capture the changes in the position of the objects in the environment before they pose a danger to the vehicle. For example, the lidar may scan the surrounding environment by rotating one or more light beams around a rotational axis while scanning the direction of propagation of the light beams in a plane parallel to the rotational axis. In some cases, a lidar may scan a portion of the surrounding environment within a polar and azimuthal angular range with respect to a lidar reference frame. In some such cases, the azimuthal angular range scanned by a lidar may be a full angle (360 degrees), while the polar angular range may be a smaller angle (e.g., ±20 degrees, ±30 degrees, ±40 degrees, or other ranges).

In some cases, to evaluate the performance of a lidar, its range finding function, the optical characteristics (e.g., power, intensity noise, frequency noise, polarization, wavelength, and the like), and/or temporal variation of the optical characteristics of the light beams emitted by the lidar are measured and quantified under a real operational condition (e.g., while lidar is scanning the environment) and within a range of environmental conditions. In certain cases, an automotive qualification may require the lidar to be tested under class one operational condition. For example, the ISO and AEC-Q requirements may require that the performance of a lidar is to be characterized and evaluated under real operational conditions when the ambient temperature changes between −40 to 85 degrees centigrade.

However, measuring the optical characteristics of the light beams that are moving (e.g., rotating) at high a speed, and in the meantime evaluating the range finding function of different channels of the lidar is a challenging task. Moreover, controlling and monitoring the environmental condition (e.g., temperature, humidity, and the like) around the lidar may interfere with characterization of optical characteristics beams and testing the range finding function. As such, most current lidar characterization systems and methods measure the optical characteristics of the light beams and the operation of the lidar, by locking the scanning function to stop the movement of the light spots and characterize the lidar under static condition. Unfortunately, the discrepancy between the test results obtained under such static condition and those obtained under real operational condition (e.g., when the lidar actively scans the surrounding environment), can be significant.

The systems and methods disclosed herein relate to measurement systems for characterizing lidar or lidar sensors designed to carry out measurements for detecting objects in an environment surrounding the lidar. More specifically, the systems and methods disclosed herein enable characterizing the light beams (e.g., laser beams) emitted by a lidar and evaluating the range finding function of different lidar channels while the light beams move or rotate at an operational scanning or operational rotational speed. In some examples, range finding function may comprise generating a lidar signal usable for estimating a distance between the lidar and a target. In some cases, evaluating the range finding function of the lidar may comprise, a distance between the lidar and a target using a lidar signal generated by the lidar. In some such cases, evaluating the range finding function of the lidar may further comprise determining the accuracy of the determined distance. In some cases, evaluating the range finding function of the lidar may comprise determining one or more properties of the lidar signal such as signal-to-noise ratio, amplitude, phase noise, and other signal properties. Additionally, the disclosed systems may allow changing various ambient environmental parameters (e.g., temperature, humidity, and the like), during the optical characterization process and/or the range finding evaluation process. Some of the disclosed systems and methods may be used to detect deviations of the optical characteristics (e.g., optical power, optical intensity, polarization, wavelength, optical spectrum, etc.) of light beams emitted by the lidar from predefined ranges, and/or evaluate the accuracy of range finding function of an individual lidar channel, while the lidar light beams move at a lidar operational speed and the lidar is exposed to various environmental conditions. Subsequently, the detected deviations of the optical characteristics from predefined or standard ranges and/or inaccuracies identified in the range finding function of an individual lidar channel, may be used to modify a component or subsystem of the lidar or adjust a parameter of the lidar.

In some embodiments, the measurement system includes a housing that forms a cavity with an optically reflective (or diffuse reflective) internal surface within which the lidar is housed and tested. In some cases, the housing may include a first and a second exit apertures herein referred to as apertures. Apertures may be windowless openings through which light beams can freely exit the internal volume of the cavity.

The first aperture may allow a light beam emitted by at least one selected channel of the lidar to exit the cavity and the housing during a first portion of a rotational period of the lidar without being reflected by the reflective internal surface. This light beam may be directed to a target exterior to the housing and cavity that reflects the light beam back to the lidar, so that the range finding operation of the selected lidar channel can be evaluated during the first portion of the rotational period. One or more optical guards positioned near the first aperture may prevent the light beams emitted during the first portion of the rotational period by other channels of the lidar (that are not selected) from reaching the target or being reflected back to the lidar by the reflective internal surface. In some implementations, the lidar may be mounted on a rotational stage that allows a user or an electronic controller to select one or more channels that are tested for range finding function. In some examples, selecting one or more channel may comprise optically aligning the one or more channels with the second aperture of the housing.

Advantageously, by eliminating the possibility of light beams emitted by channels that are not selected for range finding test to be reflected back to the lidar, the disclosed measurement system enables accurately measuring and evaluating the range finding operation of one or more selected channels at a time. Given the high sensitivity of receivers of the lidar, even a small amount light that is not associated with the reflection of the light emitted by a selected channel, can interfere with the range finding operation of the selected channel.

The second aperture may be configured to allow at least a portion of light beams emitted by the lidar during a second portion of the rotational period of the lidar and redirected by the internal surface of the cavity toward the second aperture, so that they can interact with an optical measurement device. The optical measurement device may be used to measure one or more optical characteristics (e.g., optical intensity, optical power, wavelength, polarization, or optical spectrum), or temporal variation of optical characteristics, of the light beams received via the second aperture.

In some cases, the first and the second portions of the rotational period may be non-overlapping time intervals. In some cases, the second portion of the rotational period can be longer than the first rotational period.

Lidar System

A lidar system may include a lidar sensor that is designed to emit at least one light beam (e.g., a laser beam) and receive a reflected light beam resulting from the emitted beam being reflected from an object. The emitted light beam may comprise continuous wave (CW) light or pulsed light. In some cases, the lidar sensor may generate an electronic signal herein referred to as lidar signal usable for estimating a distance between the lidar sensor and the object. The lidar system may further include subsystems for processing the lidar signal to estimate the distance between the lidar sensor and the object.

FIG. 1A is a diagram illustrating a perspective view of an example lidar device 100. In some cases, the lidar device 100 can be a lidar sensor. In some cases, the lidar device 100 can be a lidar system. The lidar device may emit light beams (e.g., laser beams) that rotate around a rotational axis 106 to scan an environment surrounding the lidar device 100. At a given time during a rotational period, the lidar device 100 may emit a plurality of light beams 104 that propagate to different directions with respect to an emission axis 111. In some examples, the emission axis or direction 111 can be perpendicular to the rotation axis 106. In some embodiments, the direction of propagation of the plurality of light beams 104 with respect to the emission direction 111 may be within an azimuthal static angular range in a plane perpendicular to the rotation axis 106, and within a polar static angular range in a plane parallel to the rotational axis 106. In some examples, the plurality of light beams 104 may be associated with a plurality of lidar channels. In some such examples, each channel of the lidar device 100 may emit one or more light beams. In some cases, light beams emitted by a single lidar channel may be substantially parallel to each other. In some cases, an angle between light beams emitted by a single lidar channel may be less than 2 degrees. In some cases, a number of beam emitted by the lidar may be from 5 to 10, 10 to 20, 20 to 30, 30 to 40, 40 to 50, 50 to 70, 70 to 100, 100 to 200, or any number larger or smaller.

The lidar device 100 may emit the plurality of the light beams 104 via a lidar exit aperture 102. In some cases, the lidar exit aperture 102 may have a height along the rotational axis 106 and a width along a direction perpendicular the rotational axis 106. In some cases, an individual light beam is emitted by a single channel of the lidar device 100. In some implementations, the lidar channels may be arranged in an M by N matrix within the lidar exit aperture 102 where N×M is the total number of lidar channels.

In some cases, the lidar device 100 may emit two or more light beams substantially at the same time. In some cases, the light beams are emitted at different times. For example, the lidar device 100 may emit one light beam in one direction at any given time. In some implementations, the plurality of light beams 104 may comprise light beams directed to different directions at different times using a movable optical reflector of the lidar device 100. For example, the lidar device 100 may comprise a moving mirror that scans the surrounding environment by reflecting a light beam (e.g., a laser beam) generated by a light source (e.g., a laser source) of the lidar in different directions. In some cases, the mirror may rotate around the rotational axis 106 while its polar angle with respect to the rotational axis 106 is scanned back and forth within a set polar angle range such that during a rotational period the direction of propagation of the reflected light beam varies within the set polar angle range while rotating around the rotational axis 106.

In some cases, the emission axis 111 may rotate around a rotation axis 106 of the lidar device 100 with a rotation period or scanning period (T). The rotational axis 106 can be perpendicular to the emission axis 111. In some such cases, the plurality of light beams 104 may rotate around the rotational axis 106 such that the propagation direction of each light beam with respect to the emission axis 111 remains constant during a rotation period. In some cases, during a rotational period (T) the emission axis 111 may rotate from a first angular or rotational position (e.g., an azimuthal angular position with respect to the rotational axis 106) to a second angular position and rotate back to the first angular position. In certain cases, during one rotational period, the rotation axis 106 may rotate 360 degrees around the rotational axis 106. In some cases, a polar angle of the emission axis 111 with respect to the rotational axis 106 may change during a rotational period. For example, during a rotational period, an angular position of the emission axis 111 may change from a first polar angle to a second polar angle and back to the first polar angle.

FIG. 1B is a diagram illustrating a top view of the example lidar device 100 having an emission axis 111 rotating around the rotational axis 106 where the emission axis 111 is perpendicular to the rotational axis 106. During a portion of a rotational period, the emission axis may rotate from a first angular position to a second angular position. In some cases, the first angular position can be a reference angular position and the second angular position may be an azimuthal angular position relative to the first angular position with respect to the rotational axis 106. The emission axis 111*a* shown in FIG. 1B may represent the reference angular position at which the emission axis 111 starts its rotational period at a first time ($t_1$). The emission axis 111*b* may represent the emission axis 111 of the lidar device 100 at a second time ($t_2$). The emission axis 111*b* is rotated with respect to the emission axis 111*a* by an angle 112 that is substantially equal to $(t_2-t_1/T)\times 2\pi$.

The light beams 104*a* shown in FIG. 1B may be projections of the plurality of light beams 104 on a plane perpendicular to the rotational axis 106 (e.g., y-z plane). The directions of the propagation of the projected light beams 104*a* may be limited by the azimuthal static angular range 108. In some cases, the directions of propagation of the light beams 104*a* with respect to the emission axis 111 may not change during a rotation period. For example, the directions of propagation of projected light beams 104*b* with respect to the emission axis 111*b* (at the second time) may be substantially identical to the directions of propagation of projected light beams 104*b* with respect to the emission axis 111*a* (at the first time). Accordingly, the azimuthal static angular range 108*a* of projected light beams 104*a* the and the azimuthal static angular range 108*b* of projected light beams 104*b* may be substantially equal. In some cases, the azimuthal static angular range 108*a* and 108*b*, each may be extended symmetrically around the emission axis 111*a* and emission axis 111*b* respectively.

FIG. 1C is a diagram illustrating a side cross-sectional view of the lidar device 100 (e.g., in x-z plane) emitting the plurality of light beams 104. The light beams 104*c* shown in FIG. 1C may be a projection of the plurality of light beams 104 on a plane parallel to the rotational axis 106 (e.g., x-z plane). The directions of the propagation of the projected light beams 104*c* may be limited by the polar static angular range 110. The polar static angular range 110 of the lidar device 100 and the directions of the projected light beams 104*c* with respect to the emission axis 111, may not change during a rotational period.

Figure 1D:
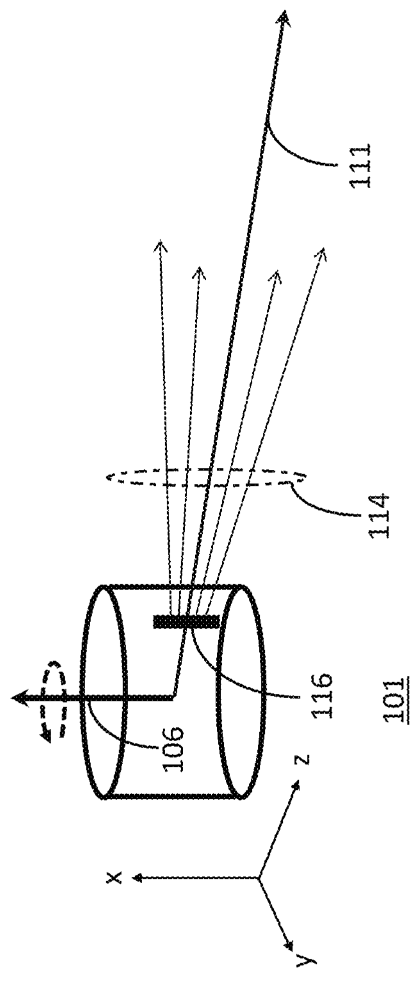
Figure 1F:
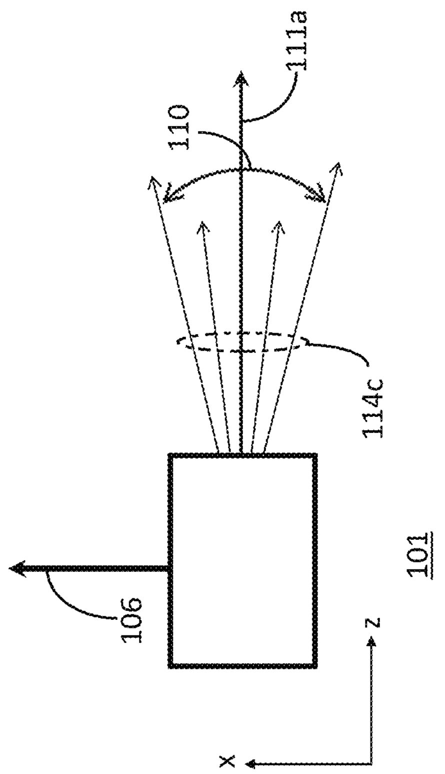
Figure 1E:
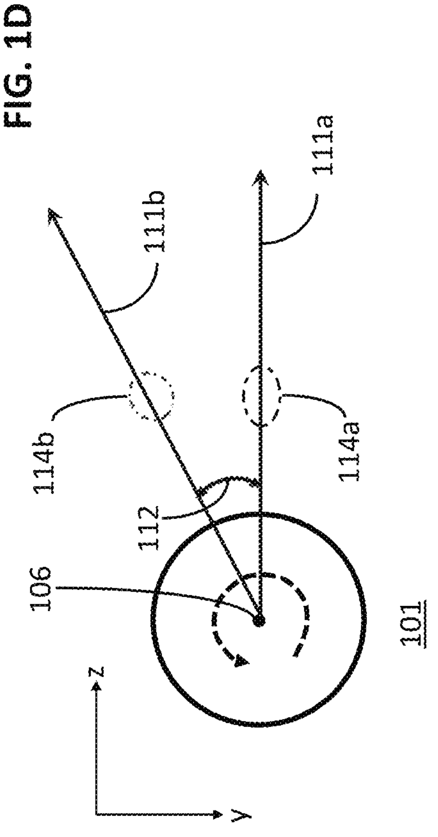

In some cases, the azimuthal static angular range of a lidar device may be substantially zero or near zero. For example, the plurality light beams 104 emitted by the lidar device 100 may be distributed in the plane defined by the rotation axis 106 and the emission axis 111. An example of such lidar device 101 and the corresponding light beams are illustrated in FIG. 1D. In some cases, exit aperture 116 of the lidar device 101 comprise an elongate shape extended along the rotation axis 106. FIGS. 1E and 1F are diagrams illustrating top and side views of the lidar device 101 emitting plurality of light beams 114 that are all propagating in a plane defined by the rotation axis 106 and the emission axis 111. As shown in FIG. 1E, since the static azimuthal angular range does not change during the rotation. As such, at a first time ($t_1$) and a second time ($t_2$) during the rotational period, the projection 114*a* of the plurality of light beams 114 on the y-z plane (perpendicular to the rotation axis 106), overlaps with the emission axis 111*a* and emission axis 111*b* respectively. In such cases, at any time during the rotational period of the lidar device 101, all channels of the lidar device 101 may emit light beams having the same azimuthal angular position with respect to the reference angular position but propagate at directions having different polar angles with respect to the rotational axis 106. FIG. 1F illustrates a side cross-sectional view of the lidar device 101 (e.g., in x-z plane) emitting the plurality of light beams 114, at an arbitrary time during a rotation period. The light beams 114*c* shown in FIG. 1F may be projections of the plurality of light beams 114 on a plane parallel to the rotational axis 106 (e.g., x-z plane). The directions of the propagation of the projected light beams 114*c* in the x-z plane may be limited by the polar static angular range 110. The polar static angular range 110 of the lidar device 101 and the directions of the projected light beams 104*c* with respect to the emission axis 111, may not change during a rotational period. In some cases, a polar angle between a light beam of the light beams 114*c* and the next light beam can be equal to a polar angular inter-channel spacing.

In some cases, the lidar device 100 or the lidar device 101, can be ToF lidars and the plurality of light beams 104 and 114, may be comprise pulsed light beams. In certain cases, the lidar device 100 or the lidar device 101, can be other types of lidars and the plurality of light beams 104 and 114, may be comprise CW light beams, or modulated CW light beams (e.g., amplitude, frequency, or phase modulated light beams).

The lidar devices 100 and 101, may include a plurality of optical receivers configured to receive reflected light beams associated with the emitted light beams 104 and 114 respectively. In some cases, an individual optical receiver may receive a reflected light beam associated with a single channel of the lidar device 100 or 101 or a light beam emitted at specific direction with respect to the emission axis 111. In some cases, the lidar devices 100 and 101 may receive reflected light beams via the exit aperture 102 and 116 respectively.

In some cases, the light beams 104 may comprise laser beams generated by one or more laser sources of the lidar device 100 or 101. In various implementations, the wavelength of a light beam (e.g., a laser beam) emitted by a lidar device may be within an operational wavelength range of the lidar device. In some cases, the operational wavelength range of a lidar can be from 800 to 850 nm, 850 nm to 900 nm, 900 nm to 950 nm, 950 nm to 1000 nm, 1400 nm to 1500 nm, 1500 nm, to 1500 nm, 1600 nm to 1700 nm, or any other range formed by any of these values or may be outside these ranges.

Measurement System

In some cases, a performance of a lidar system or lidar sensor under real operational condition may be measured and characterized using a lidar measurement system (also referred to herein as "measurement system"). In some cases, a measurement system may be used to measure an optical characteristic (e.g., optical power, optical intensity, optical spectrum, polarization, or other optical characteristic) of the light beams emitted by the lidar under test during the operation of the lidar. Additionally, or alternatively, a lidar measurement system may be used to test and characterize the range finding function of one or more channels of the lidar under test during the operation of the lidar. In some cases, a measurement system may be used to measure a temporal variation of an optical characteristic of the light beams emitted by the lidar under test during the operation of the lidar.

In some implementations, the measurement system may be configured to allow one or more light beams emitted by a selected channel of the lidar under test at least during a portion of its rotational period, to become incident on a target and be received by the lidar under test (e.g., by a receiver of the lidar) after reflection off of the target. The lidar under test may generate a lidar signal or a measured distance based on a comparison between the emitted light beam and the corresponding received reflected light beam. The lidar signal or the measured distance may be used to evaluate the range finding function of the lidar.

In some cases, the measurement system may be configured to continuously collect at least a portion of light beams emitted by a lidar device (e.g., a lidar sensor or a lidar system) during a at least a portion of the rotational period. The measurement system may comprise an optical (or optoelectronic) measurement system configured to measure at least an optical parameter associated with an optical characteristic of the light beams. In some cases, a measured value of the optical parameter may be a value averaged over different channels of the lidar and/or over one or more measurement periods comprising a portion of one or more rotational periods.

In some implementations, the measurement system may be configured to allow one or more light beams emitted by a selected channel of the lidar under test during a first portion of its rotational period, to become incident on a target and be received by the lidar under test (e.g., by a receiver of the lidar) after reflection off of the target. The measurement system may be further configured to continuously collect at least a portion of light beams emitted by a lidar device during a second portion of the rotational period. In some cases, the first and the second portions of the rotational period may be non-overlapping time intervals. In some cases, the second portion of the rotational period can be a longer time interval than the first portion.

In some cases, the measurement system may comprise a housing that forms a cavity having an internal volume inside which the lidar under test (LUT) may be placed during a test and measurement process. An LUT may be a lidar operating under a real operational condition for which the LUT is designed. For example, while in the housing, the LUT may emit plurality of rotating light beams that rotate around the rotational axis of the LUT at an angular velocity within an operational angular velocity of the LUT (e.g., between 300 and 1400 rpm or other rpm's). In some cases, an ambient environment of the LUT (e.g., within the cavity or the internal volume) may have a temperature and/or a humidity level substantially equal to those of an environment in which the LUT is designed to operate (e.g., when mounted on a vehicle as part of an autonomous driving system). In some cases, a mechanical state of the LUT (e.g., vibrational, rotational, or translational) may be similar to a mechanical state at which the LUT is designed to operate (e.g., the mechanical state of moving vehicle).

In some implementations, an internal surface of the cavity formed by the housing may have spherical or near spherical shape. In some cases, the internal surface of the cavity may have an elliptical, parabolic, hyperbolic or other shape. In certain cases, the internal surface of the cavity may include one or more flat surfaces. In some examples, the internal surface of the cavity may comprise an optically reflective surface configured to reflect light having a wavelength with the operational wavelength range the lidar under test. In some such examples, the optically reflective surface may comprise a diffuse reflective surface (e.g., a surface comprising a diffuse white reflective coating). In some examples, a portion of the internal surface may comprise an optically absorptive surface.

In some cases, the housing may comprise one or more optical surfaces forming the internal volume of the housing. An optical surface can be an absorptive or reflective optical surface. An absorptive optical surface can be a surface configured to absorb light having a wavelength within the operational wavelength range of the LUT. A reflective optical surface can be a surface configured to reflect light having a wavelength within the operational wavelength range of the LUT. In some cases, the optical surfaces may comprise flat or curved surfaces. In some examples, curved optical surfaces may comprise parabolic, elliptical, or other curved surfaces.

In some examples, the housing may include a lidar seat configured to hold and/or mechanically stabilize the lidar in a desired position within the cavity. In some cases, the orientation of the lidar seat with respect to the housing may be controlled by a mechanical control stage positioned inside the cavity. In some such cases, the mechanical control stage may be used to control and/or adjust the orientation of the lidar mounted on the lidar seat relative to the internal surface of the cavity.

In some implementations, the internal surface of the cavity formed by the housing may include one or more apertures configured to allow light beams emitted by the LUT to be captured by a measurement device and/or interact with a target outside of the cavity.

In some cases, the internal surface of the cavity or the optical surfaces that form the internal volume of the measurement system, may be configured to redirect the light beams emitted by the LUT (placed inside the cavity or the internal volume) toward a detection aperture, at least during a portion of the rotational period of the LUT. In some cases, the optical surfaces may redirect light by diffusive reflection. In some cases, the detection aperture can be a hole or an opening on the internal surface of the cavity. In some cases, the detection aperture can be a sensing area of an optical measurement device (e.g., an optical detector, an optical power meter, an optical spectrum analyzer, and the like). In some cases, light received via the detection aperture may comprise light associated with light beams emitted by the LUT during a portion of its rotational period.

In some cases, a target aperture (a first aperture) may allow one or more selected light beams emitted by a the LUT during a first portion of a rotation period of the lidar, to exit the cavity and reach a target outside the cavity through a direct optical path from the lidar to the target. In some cases, the one or more selected light beams may be emitted by a selected (e.g., user selected) channel of the LUT. The direct optical path may be a straight line between the exit aperture of the LUT (e.g., exit aperture 102 or 116 of the lidar devices 100 and 101) and the target. In some implementations, the housing may comprise one or more optical guards configured to interact with a portion of light beams emitted by the lidar under test during the first portion of the rotational period. For example, an optical guard may be configured to interact with light beams other than the light beam(s) selected to directly exit the cavity. In some cases, interaction of an optical guard with a light beam may comprise absorption of the light beam by the optical guard. In some cases, interaction of an optical guard with a light beam may comprise reflection of the light beam by the optical guard. In some cases, an optical guard may have an optical surface that interacts with the light beams emitted by the lidar under test.

In some cases, a reflective optical surface of an optical guard may be configured to redirect a non-selected light beam such that an angle between the non-selected light beams and a selected light beam (that directly exits the cavity without being reflected), is larger than a minimum deflection angle of the housing 200. The minimum deflection angle of a housing can be a design parameter for designing and positioning the optical guards within the housing. For example, a minimum deflection angle of a housing may be determined based at least in part on a size of a target used to reflect the selected light beam back to the housing, and a distance between the target and the housing. Alternatively, the minimum deflection angle of a housing, may limit the size of the target and/or the minimum distance from the housing at which the target may be positioned.

In some cases, the detection aperture (a second aperture) may be positioned on the internal surface of the cavity such that a portion of light beams emitted by the lidar under test during a second portion of its rotational period, can exit the cavity. The internal surface of the cavity can be configured to redirect the portion of light beams emitted during the second portion toward the detection aperture.

Example Housing of a Lidar Measurement System

Figure 2A:
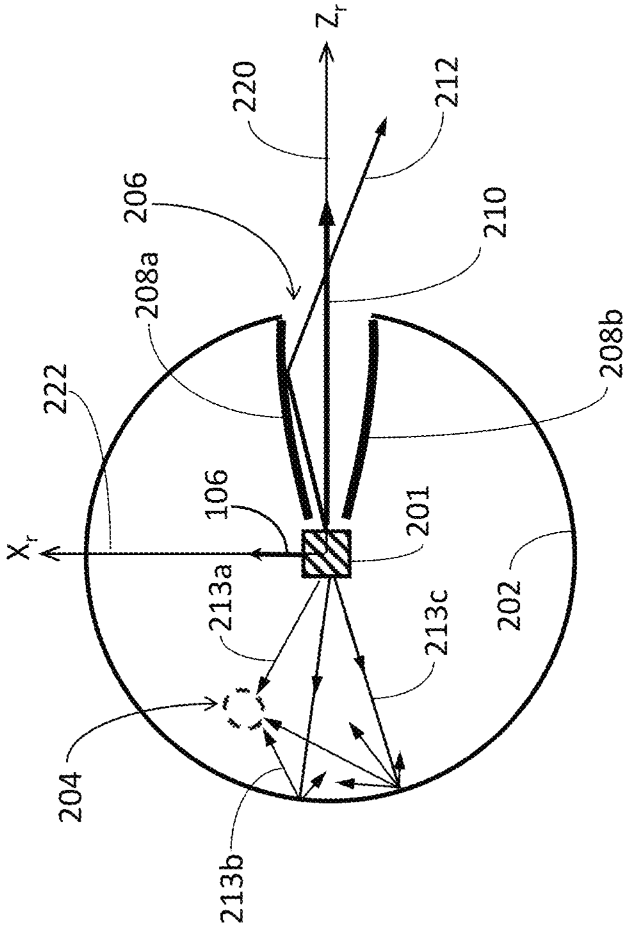
FIGS. 2A-2C are diagrams illustrating side, front, and top cross-sectional views of an example housing respectively.
Figure 2B:
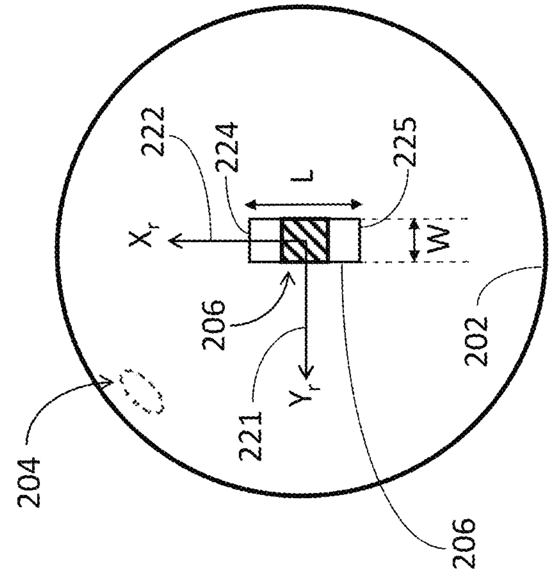

FIGS. 2A and 2B are diagrams illustrating a side cross-sectional view and a front view of an example housing 200, respectively. The housing 200 may be the housing of a measurement system for characterizing a lidar system or lidar sensor (e.g., the lidar device 201). In the example shown, the housing 200 forms a spherical or near spherical cavity having a spherical internal surface 202 where a distance between points on the internal surface 202 and a center of the cavity are substantially equal. However, it will be understood that any number of shapes can be used for the housing such that the distance between points on the internal surface 202 and the center of the cavity are not substantially equal. In some implementations, the lidar device 201 may be positioned near or at the center of the cavity. In certain implementations, the lidar device 201 may be placed between the center of the cavity and the internal surface 202. In some cases, the lidar device 201 may comprise the lidar device 100 or the lidar device 101.

The radius of curvature of the internal surface 202 (e.g., a distance between the center of the cavity and the internal surface 202) may be from 10 to 20 inches, 20 to 30 inches, 30 to 40 inches, 40 to 50 inches, or any other range formed by any of these values or may be outside these ranges. In some cases, at least a portion of the internal surface 202 of the cavity may have a high optical reflectivity for wavelengths within the operational wavelength range of the lidar device 100. In some cases, a reflection coefficient of the internal surface 202 for light emitted by the lidar device 201 may be between 80% and 85%, 85% and 90%, 90% and 95%, 95% and 99%, 99% and 99.9%, or any other range formed by any of these values or may be outside these ranges. In some cases, the internal surface 202 may comprise a diffuse reflective surface.

The housing 200 may include a first aperture 206 (e.g., an opening) positioned on the internal surface 202 of the cavity. In some cases, the first aperture 206 may be positioned such that at least one light beam emitted by the lidar device 201 can exit the cavity without being reflected by the internal surface 202, during at least a portion of a rotational period of the lidar device 201. In some cases, the position of the first aperture on the internal surface 202 may be used as a reference position. For example, the origin of a reference coordinate system (Xr, Yr, Zr) of the housing 200 may the center of the spherical cavity and an axis of the reference coordinate system (e.g., the Zr-axis 220) may pass through a point within the first aperture 206 (e.g., a center of the aperture). In some cases, the origin of a reference coordinate system (Xr, Yr, Zr) of the housing 200 may be located between the center of the spherical cavity and the internal surface 202 and an axis of the reference coordinate system (e.g., the Zr-axis 220) may pass through a point within the first aperture 206 (e.g., a center of the aperture).

In some cases, the first aperture may have an elongate shape. In some examples, such as the examples shown in FIG. 2A and FIG. 2B, the first aperture 206 may comprise a spherical rectangle on the internal surface of the cavity. The spherical rectangle may be extended between a top edge 224 to a bottom edge 225. The spherical rectangle may have a width (W) along a first geodesic on the internal spherical surface and a length (L) along a second geodesic perpendicular to the first geodesic. The length (L) may be longer than the width (W). In some examples, W can be from 1 to 2 inches, 2 to 3 inches, 3 to 4 inches, or any other range formed by any of these values or may be outside these ranges. In some examples, L can be from 2 to 6 inches, 6 to 10 inches, 10 to 14 inches, 14 to 20 inches, 20 inches to 25 inches, or any other range formed by any of these values or may be outside these ranges. It will be understood that other shapes can be used for the first aperture 206, such as, but not limited to triangular, trapezoidal, elliptical, polygonal, shapes including parabolic and/or hyperbolic sections, etc.

In some cases, a first axis (Zr-axis) 220 of the reference coordinate system of the housing 200 may pass through the center of the first aperture 206. In some such cases, an equatorial plane defined by the Zr-axis 220 and a second axis 221 (e.g., Yr-axis) of the reference coordinate system perpendicular to the Zr-axis 220, may divide the first aperture (spherical rectangle) 206 into two sections (e.g., an upper and a lower section) along its length. Accordingly, the third axis 222 (e.g., Xr-axis) of the reference coordinate system of the housing 200 may be perpendicular to equatorial plane.

In some cases, the length L and the width W of the first aperture 206 may be selected such that, at least during a portion of the rotational period of the lidar device 201, at least one light beam emitted by the lidar device 201 exits the cavity via the first aperture 206 without interacting with the internal surface 202 of the cavity or the edges of the first aperture 206. In some cases, the length L of the first aperture 206 may be selected such that, at least during a portion of the rotational period of the lidar device 201, one of the light beam emitted by the lidar device 201, exits the cavity via the first aperture 206 without interacting with the internal surface 202 of the cavity or the edges of the first aperture 206. In some cases, the length L of the first aperture 206 may be selected such that, at least during a portion of the rotational period of the lidar device 201, a group of light beams emitted by the lidar device 201 (e.g., a group of light beams each emitted by a separate channel of the lidar devices 201), exit the cavity via the first aperture 206 without interacting with the internal surface 202 of the cavity or the edges of the first aperture 206. In some cases, the group of light beams may include less than 10 light beams, less than 40 light beams, less than 60 light beams, or less than 100 light beams. In some cases, the number of light beams in the group of light beams may be determined by a polar angular width of the first aperture 206. In some cases, the polar angular width of the aperture 206 can be substantially equal to L/R, where R is the radius of the cavity. In some examples, the polar angular width of the first aperture 206 may be less than 5 degrees, less than 10 degrees, or less than 20 degrees. An interaction of a light beam with a surface or an edge may comprise reflection, diffraction, or absorption by the surface or the edge.

In some implementations, the housing may comprise at least one optical guard. In some cases, the optical guard can be configured as an optical reflector to reflect at least one light beam originated inside the cavity toward the first aperture such that the light beam exits the cavity via the first aperture 206 after reflection by the optical reflector. In some cases, the housing may comprise two such optical reflectors where the reflective surfaces of the two optical reflectors face each other. In some cases, the two optical reflectors may be configured to allow a selected light beam (e.g., light beam emitted by a single channel of the lidar under test), originated inside the cavity and propagating in a first direction to directly exit the cavity without being reflected by any surface. In some cases, the two optical reflectors may be configured to allow a selected group of light beams (e.g., light beams emitted by multiple channels of the lidar under test), originated inside the cavity and propagating in different directions, to directly exit the cavity without being reflected by any surface. Further, the two optical reflectors may reflect optical beams originated inside the cavity that propagate along directions different than the first direction or the directions of the propagation of the selected group of light beams. In some cases, each optical reflector may be configured to reflect light beams propagating along directions different than the first direction (or the directions of the propagation of the selected group of light beams) such that the directions of propagation of the resulting reflected light beams, make an acute angle with the first direction larger than the minimum deflection angle of the housing 200.

An optical reflector may comprise at least one reflective surface that has an optical reflectance from 70% to 90%, 90% to 95%, 95% to 99% or larger or smaller values, for wavelengths within the operational wavelength of the lidar under test. In various implementations, an optical reflector may have an elongated shape (e.g., rectangular, elliptical, and the like), and it may comprise a curved or a flat reflective surface. In some cases, an optical reflector may be extended between an edge of the first aperture and near a positon where the exit aperture of the lidar under test may be positioned.

With continued reference to FIG. 2A, the housing 200 can include a top optical reflector 208*a* and a bottom optical reflector 208*b*. Each optical reflector may be extended from a first end near the first aperture 206 (e.g., near an edge of the aperture 206), to a second end close to the center of the cavity (the origin of the reference coordinate system) along the Zr-axis 220. In the example shown, the optical reflectors 208*a*/208*b* may comprise curved reflective surfaces facing each other. In some cases, the first end of the top optical reflector 208*a* may positioned close to the top edge 224 of the first aperture 206, and the second end of the top optical reflector 208*a* may positioned close to a location near the origin of the reference coordinate system or near a location where the lidar device 201 may be positioned, and above the equatorial plane. The first end of the bottom optical reflector 208*b* may positioned close to the bottom edge 225 of the first aperture 206, and the second end of the bottom optical reflector 208*a* may positioned close to a position near the origin of the reference coordinate system or near a location where the lidar device 201 may be positioned, and below the equatorial plane. However, it will be understood that additional or different optical reflectors can be used. For example, the optical reflectors may be on either side of the first aperture or there may be optical reflectors on the top, bottom, and sides of the aperture 206, etc.

In some cases, the first end of the top optical reflector 208*a* may be connected to the top edge 224 of the first aperture 306 and the first end of the bottom optical reflector 208*b* may be connected to the bottom edge 225 of the first aperture 306. In some cases, a vertical distance (parallel to Xr-axis) between the second end of the top optical reflector 208*a* and the second end of the bottom optical reflector 208*b* may be substantial equal or close to a height of the lidar exit aperture 102. In some cases, a vertical distance (parallel to Xr-axis) between the first end of the top optical reflector 208*a* and the first end of the bottom optical reflector 208*b* may be substantial equal or close to a vertical distance between the top edge 224 and the bottom edge 225 of the first aperture 206.

In some cases, the top and bottom optical reflectors 208*a*/208*b* may have a length between the first end and the second end and a width along the Xr-axis. In some cases, a projection of the top and/or the bottom optical reflectors 208*a*/208*b* on the equatorial plane may have a rectangular or other shape (e.g., triangular, trapezoidal, etc.). In some such cases, a width of the projected rectangle may be substantially equal to the width of the respective optical reflector.

In some cases, the lidar device 201 may be positioned inside the cavity such that its rotational axis 106 is substantially parallel with the Xr-axis of the reference coordinate system (perpendicular to the equatorial plane of the cavity). In some such cases, lidar device 201 may be referred to as being aligned with the cavity or the housing 200. With reference to FIG. 2A, the lidar device 100 placed inside the cavity formed by the housing 200 is aligned with the cavity and the housing 200.

In some cases, a shape, a size, and/or a position of the optical reflectors 208*a* and 208*b* may be designed and selected such that when the lidar device 201 is aligned with the cavity (the rotational axis 106 is substantially parallel to $X_r$ axis), and an azimuthal angle between the emission axis 111 and Zr-axis is smaller than a threshold exit angle, the light beams emitted by the lidar device that are not substantially parallel with the emission axis 111 are reflected by at least one of the optical reflectors 208*a* and 208*b*. In some cases, the light beams that are substantially parallel with the emission axis 111 can have an angle less than 2 degrees with the emission axis 111. With reference to FIG. 2A, light beams 212 and 210 may represent light beams emitted by the lidar device 100 when the emission axis of the lidar device 201 (that is parallel to light beam 210), makes an acute azimuthal angle smaller than a threshold exit angle with the Zr-axis (a condition that will be satisfied during a portion of every rotational period).

In some cases, a shape, a size, and/or a position of the optical reflectors 208*a* and 208*b* may be designed and selected such that when an azimuthal angle between the emission axis 111 and Zr-axis is smaller than a threshold exit angle, a first group of light beams emitted by the lidar device exit the housing via the first aperture without being reflected by the optical reflectors 208*a* and 208*b*, and a second group of light beams emitted by the lidar device exit the housing via the first aperture after being reflected by at least one of the optical reflectors 208*a* and 208*b*. In some cases, each light beam of the second group of light beams is reflected at least one time by the optical reflector 208*a* or 208*b*. In some examples, the first group light beams may comprise light beams emitted by a first group of channels that are aligned with the first aperture.

In various implementations, a shape, a size, of the first aperture 206 may be designed and selected such that when an azimuthal angle between the emission axis 111 and Zr-axis is smaller than a threshold exit angle all light beams emitted by the lidar device can exit the housing 200 via the first aperture 206 (directly or after one or more reflections off of the optical reflector 208*a* and/or 208*b*).

In some cases, the threshold exit angle may be determined by an azimuthal angular width of the first aperture 206. In some cases, the azimuthal angular width of the first aperture 206 can be substantially equal to W/R, where R is the radius of the cavity. In some examples, the azimuthal angular width of the first aperture can be less than 4 degrees, or less than 2 degrees.

Figure 2C:
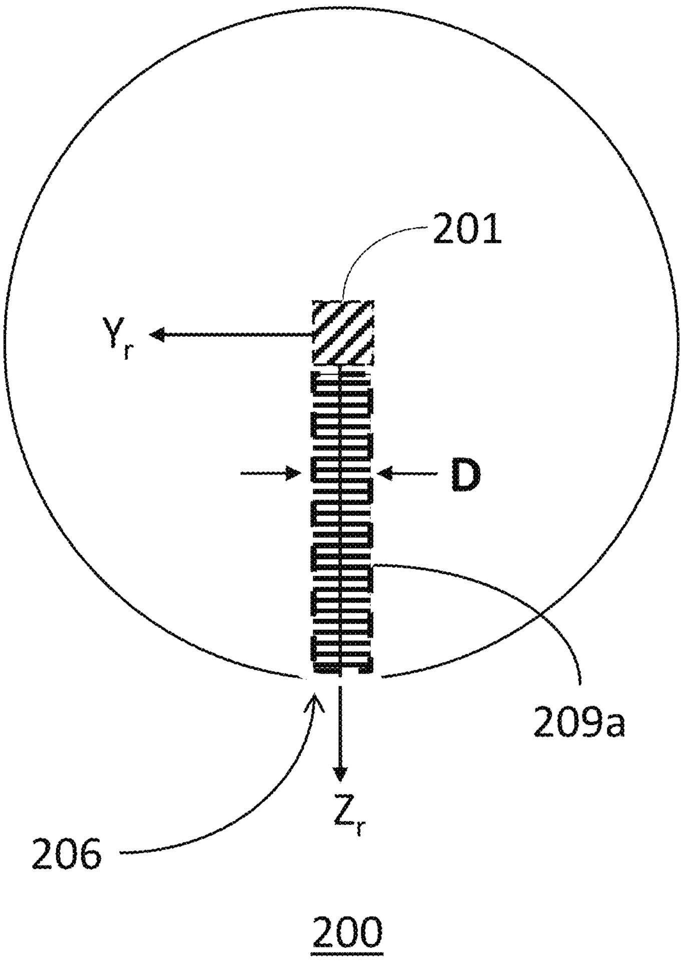

FIG. 2C is a diagram illustrating a top cross-sectional view of the housing 200 in the equatorial plane (Yr-Zr plane) of the spherical cavity. As shown in FIG. 2C, a projection of the top optical reflector 208*a* on the equatorial plane comprises a rectangular shape extended along the Zr-axis from a position where the lidar device 201 can be mounted, toward the first aperture 206. In some cases, the top optical reflector 208*a* may have a width (D) along a lateral direction perpendicular to the Xr-Zr plane. In some cases, the bottom optical reflector 208*b* may have a width along the lateral direction substantially equal to the width D of the top optical reflector 208*a*. In some such cases, the width (D) of the top and bottom optical reflectors 208*a*/208*b* may be larger or equal to the width (W) of the first aperture 206.

In some implementations, the housing 200 may comprise a second aperture 204 positioned on the internal surface of the cavity formed by the housing 200. The second aperture 204 may be configured to allow light beams originated inside the cavity and propagating in different directions to exit the cavity. In some cases, the first aperture 206 and the second aperture 204 may be positioned on the opposite sides of the internal surface of the spherical cavity with respect to Xr-Yr plane.

For example, when the lidar device 201 is placed within the cavity, at least a portion of the light beams emitted by the lidar device 201 during a portion of the rotational period may exit the cavity via the second aperture. In some cases, the light beams that exit the cavity via the second aperture 204 can correspond to light beams emitted by the lidar device 201 during the rotational period when the exit aperture (e.g., exit aperture 102 or 111) of the lidar device is not facing the first aperture 206 of the housing.

In some cases, a portion of the light beams emitted by the lidar device when an acute angle between the emission axis 111 and the Zr-axis is larger than the threshold exit angle, may exit the cavity via the second aperture 204. Depending on the orientation of the lidar device 201 with respect to the second aperture 204, some of the light beams emitted by the lidar device 201 may directly exit the cavity via the second aperture 204 and some other light beams may exit the cavity via the second aperture 204 after one or more reflections off of the internal surface 202. In some cases, the one or more reflections may include diffusive reflections. For example, at a rotational position of the lidar device 201, the light beam 213*a* may directly exit the cavity via the second aperture 204, while the light beams 213*b* and 213*c* may exit the cavity via the second aperture 204 after one or more reflections off of the internal surface 202. In some cases, the second aperture 204 may be a circular or near circular aperture having a diameter from 0.5 to 1 inch, 1 to 1.5 inches, or 1.5 to 2 inches. It will be understood that other shapes can be used for the second aperture 204, such as, but not limited to triangular, trapezoidal, rectangular, etc.

Figure 3A:
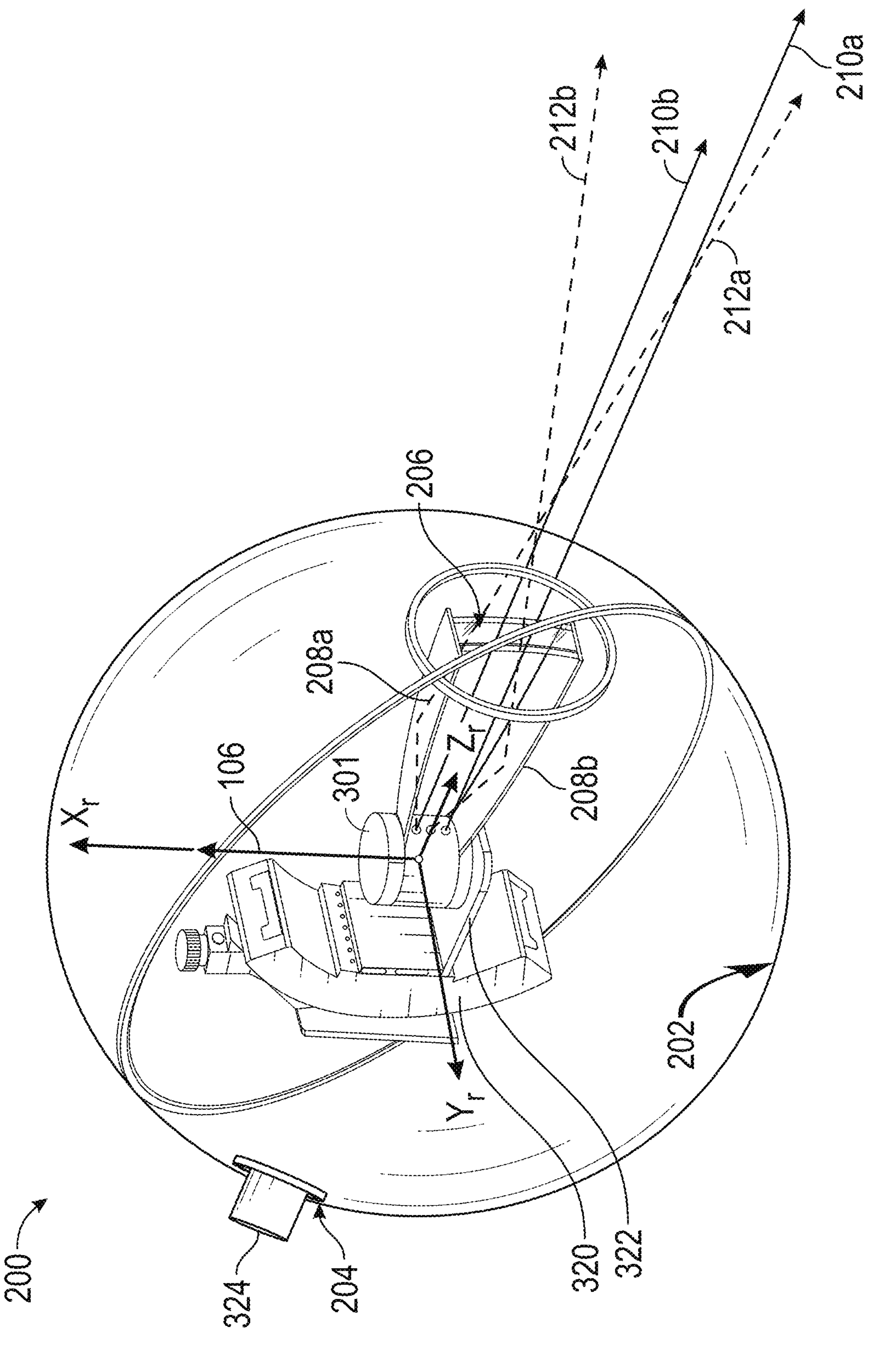
FIGS. 3A and 3B are diagrams illustrating a perspective and a side view of a housing shown having a mechanical control stage and a lidar seat.
Figure 3B:
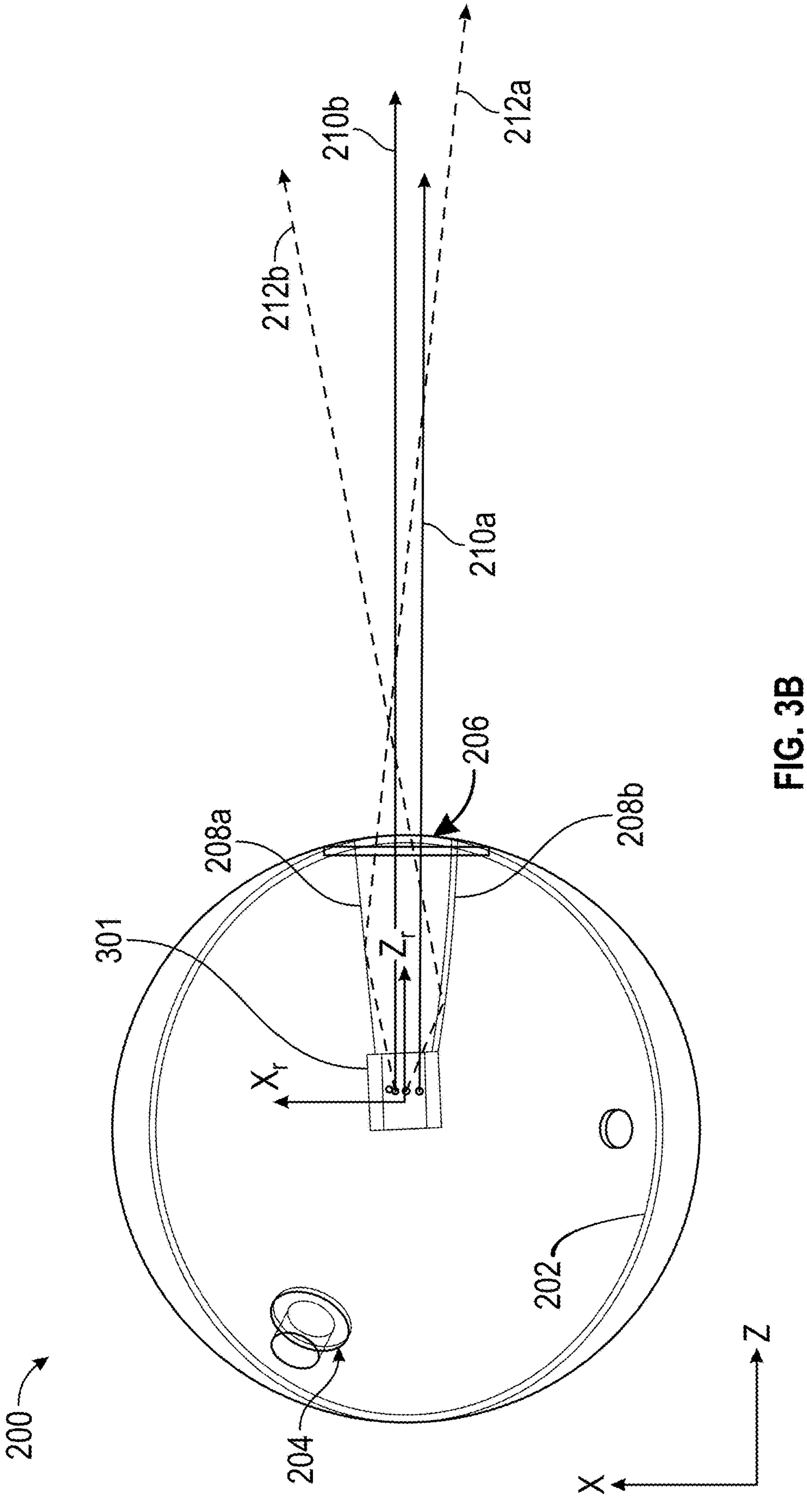

FIGS. 3A and 3B are diagrams illustrating a perspective view and a side view of the housing 200 with a lidar device 301 mounted on the lidar seat 322. In some cases, the lidar seat 322 may be positioned near the center of the cavity or near the origin of the reference coordinate system Xr-Yr-Zr. In some cases, the lidar device 301 may have one or more features of the lidar device 201 described above. For example, the light beams emitted by the lidar device 301 (e.g., light beams 210*a*/210*b*/212*a*/212*b*) may propagate in directions substantially parallel to a plane defined by the emission axis and the rotational axis of the lidar device 301.

In the example shown, the housing 200 comprises a mechanical stage 320 to which the lidar seat 322 is connected. The mechanical control stage 320 can be a rotational stage configured to rotate the lidar seat around the Yr axis. As such, the mechanical control stage 320 may be used to control an angle (a polar angle) between the rotational axis 106 (and therefore the emission axis) of the lidar device 301, and the Xr-axis by rotating the emission axis 111 in the Xr-Zr plane. In various implementations, the mechanical control stage 320 can be manually adjusted by a user or electronically controlled by an electronic control system.

In some cases, a rotational state of the mechanical control stage 320 at which the lidar device 301 is aligned with housing 200 (the rotational axis 106 is substantially parallel with the Xr-axis), may be referred to as a neutral rotational state of the mechanical control stage 320. In the example shown in FIGS. 3A and 3B, the mechanical control stage 320 is in a neutral rotational state and the emission axis of the lidar device 301 is substantially parallel with the Zr-axis. In some cases, when the lidar device 301 is aligned with the housing 200, and angle between the emission axis 111 and the Zr-axis, can be less than 2 degrees, or less than 4 degrees.

In some cases, while mounted on the lidar seat 322 within the housing 200, the lidar device may rotate at an operational angular speed around its rotational axis 106, and emit a plurality of light beams 104 at different directions (with respect to the emission axis 111). An operational angular speed at which the light beams emitted by the lidar device 301 rotates, may be from 300 to 500, 500 to 1000 rpm, 1000 to 1500 rpm, 1500 to 2000 rpm, or 2000 to 2400 rpm, or any other range formed by any of these values, or may be outside these ranges.

FIG. 3A may represent a snapshot of the lidar device 301 emitting four light beams 212*a*/212*b*/20*a*/210*b*, when the angle (azimuthal angle with respect to Xr-axis) between the emission axis 111 and the Zr-axis is less than the threshold exit angle. As shown, the light beams 212*a* and 212*b* that are not substantially parallel with the Zr-axis are reflected by the top optical reflector 208*a* and the bottom optical reflector 208*b* respectively. The light beams 210*a* and 210*b* that may be substantially parallel with the Zr-axis directly exit the cavity via the aperture 206 without being reflected by any surface. In some cases, the light beams 210*a*, and 210*b* may be emitted by a single channel or two different channels of the lidar device 301 and the light beams 212*a* and 212*b* may be emitted by two other channels of the lidar device 301. In some cases, an angular difference (e.g., polar or azimuthal with respect to Zr axis) between the direction of propagation of light beams 210*a* and 210*b* can be less than 2 degrees, or less than 1 degree. In some cases, an angle between light beam 212*a*/212*b* with the emission axis of the lidar device 301 can be lager that 2 degrees, or larger than 4 degrees.

Figure 3C:
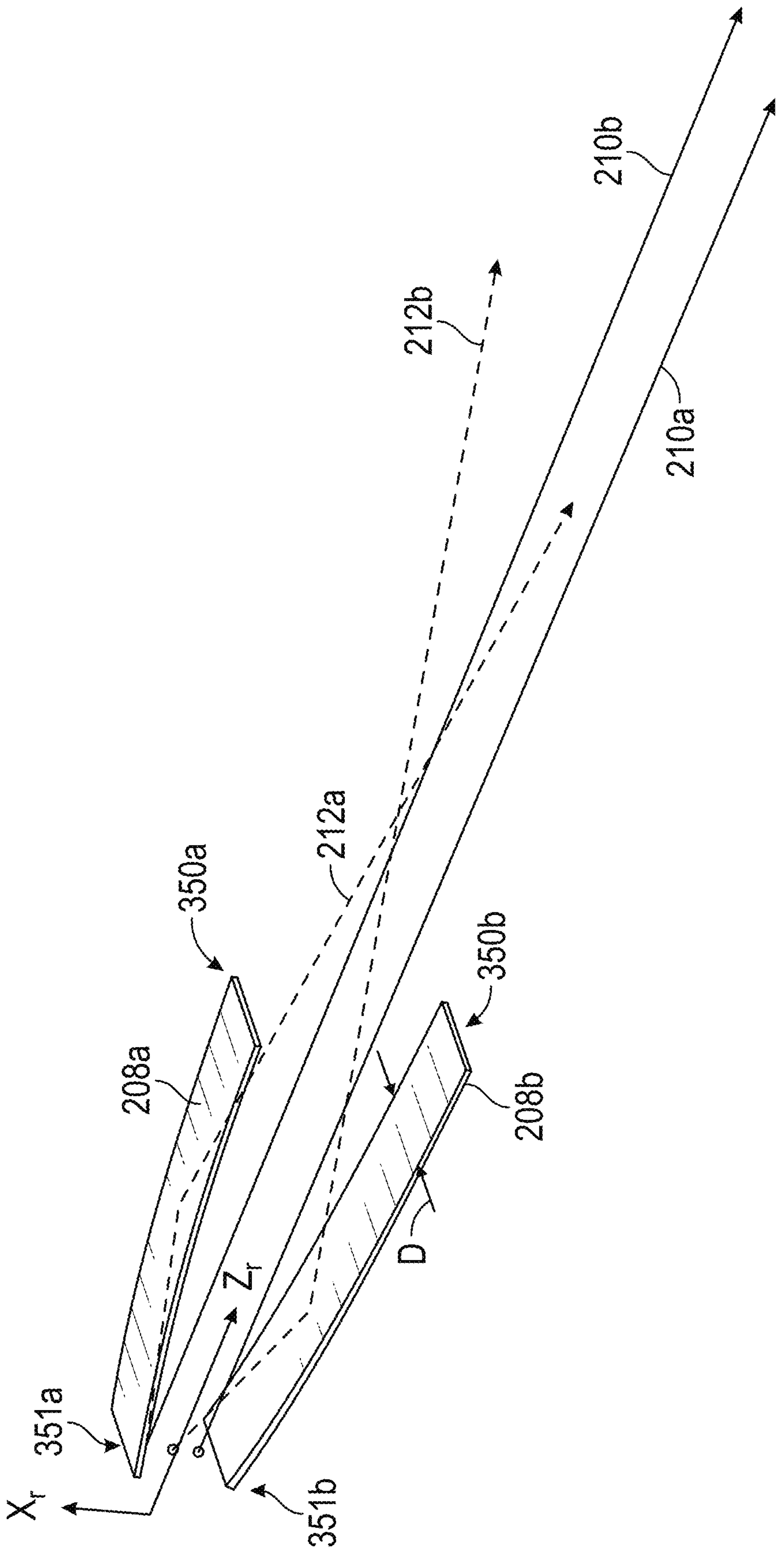
FIG. 3C is a diagram illustrating a perspective view of example optical reflectors of a housing.

FIG. 3C is a diagram illustrating a perspective view of the top 208*a* and bottom 208*b* optical reflectors of the housing 200. In the example shown, each optical reflector has a curved elongate shape extended in a longitudinal direction from a first end close to the first aperture 206 to a second end close to the lidar device 301.

In some cases, the top and bottom optical reflectors 208*a*/208*b* may be curved in a plane parallel to the Xr-Zr plane. In some such cases, the top and bottom optical reflectors 208*a*/208*b* may be also curved in a plane parallel to the Xr-Yr plane. In some cases, a radius of curvature of top optical reflector 208*a* or the bottom optical reflector 208*b* in the Xr-Zr plane may be from 5 feet to 10 feet, 10 feet to 1000 feet, or larger. In some cases, the optical reflectors 208*a*/208*b* may comprise a parabolic surface. For example, the curvature of the top reflector 208*a* or the bottom reflector 208*b* in a plane parallel to the Xr-Zr plane or the Xr-Yr plane.

A length of the optical reflector may be defined as a linear distance between the first edge to the second edge. Each optical reflector may have a width extended in a lateral direction perpendicular to the longitudinal direction from a first lateral edge to a second lateral edge. Each optical reflector may have a thickness along a vertical direction perpendicular to the longitudinal and the lateral direction, extended between a top surface and a bottom surface. In some cases, the width (D) of the optical reflector may be uniform from the first end to the second end. In some cases, the width of the optical reflector may increase from the first end to the second end. In some cases, the width D of the optical reflector may decrease from the first end to the second end. In some cases, a thickness of the optical reflector may be uniform from the first end to the second end. In some cases, a vertical distance (parallel to Xr-axis) between the first end 350*a* of the top optical reflector 208*a* and a first end 350*b* of the bottom optical reflector 208*b* may be larger than a vertical distance between the second end 351*a* of the top optical reflector 208*a* and the second end 351*b* of the bottom optical reflector 208*b*. In some cases, a vertical distance (parallel to Xr-axis) between the first end 350*a* of the top optical reflector 208*a* and a first end 350*b* of the bottom optical reflector 208*b* can be substantially equal to the length (L) of the first aperture 206. In some cases, a vertical distance between the second end 351*a* of the top optical reflector 208*a* and the second end 351*b* of the bottom optical reflector 208*b* can be substantially equal to the height of the exit aperture (e.g., exit aperture 102 or 116) of the lidar device 301.

In some cases, the optical reflectors 208*a* and 208*b* may have substantially identical shapes and sizes. In some cases, the bottom surface of the top optical reflector 208*a* and the top surface of the bottom optical reflector 208*b* that face each other, may be optically reflective surfaces. In some cases, the bottom 208*b* and the top optical reflector 208*a*, each may comprise a optically reflective surface. In some such cases, the optically reflective surface of the bottom 208*b* and the top optical reflector 208*a* may face each other. With reference to FIG. 3C, the bottom surface of the top optical reflector 208*a* and the top surface of the optical reflector 208*b* may be optically reflective surfaces.

In some examples, an optically reflective surface of the bottom 208*b* and/or top optical reflector may comprise a metal coating. In some examples, an optically reflective surface of the bottom 208*b* and/or top optical reflector 208*a* may comprise a multi-layer dielectric coating. The optically reflective surface of the top and bottom reflectors 208*a*/208*b* may have an optical reflectivity larger than 80%, 85%, 90% or 95% for wavelengths within the operational wavelength range of the lidar device 301.

In some cases, the top surface of the top optical reflector 208*a* and the bottom surface of the bottom optical reflector 208*b*, may be optically reflective surfaces. In some cases, the top surface of the top optical reflector 208*a* and the bottom surface of the bottom optical reflector 208*b*, may be optically absorptive surfaces.

In some cases, instead of two optical reflectors, the optical guard(s) of the housing can be configured as optical absorbers. In some examples, an optical absorber may comprise a specular absorber (e.g., black car paint with specular film on surface but 0.3% low reflective pigment as base color). In certain cases, the optical absorbers can be positioned similar to the top and bottom optical reflectors 208*a*/208*b* with respect to the housing 200. An optical absorber may have at least one highly absorptive surface configured to absorb light having a wavelength within the operational wavelength range of the lidar device under test. In some examples, an optical absorber may have a shape substantially similar to the top optical reflector 208*a* and/or bottom optical reflector 208*b*. In some cases, the bottom surface of the top optical absorber and the top surface of the bottom optical absorber that face each other, may comprise optically specular absorptive surfaces. In some cases, the top surface of the top optical absorber and the bottom surface of the bottom optical absorber may be optically specular absorptive surfaces. In some cases, the top surface of the top optical absorber and the bottom surface of the bottom optical absorber, may be optically reflective surfaces.

In various implementations, the optical reflectors or optical absorbers described above may be collectively referred to as optical guards.

In some examples, the light beams emitted by the lidar device 301, when the angle (azimuthal angle with respect to Xr-axis) between the emission axis 111 and the Zr-axis is larger than the threshold exit angle may be reflected one or more times by the internal surface 202 and eventually exit the cavity via the second aperture 204. In some cases, an optical (or optoelectronic) measurement device 324 may be connected to the housing 200 such that at least a portion of the light beams transmitted through the second aperture 204 become incident or a sensor surface of the optical measurement device 324. In some cases, the optical measurement device 324 may be used to measure the optical spectrum, the optical power, or other optical characteristics of the light received transmitted via the second aperture 204. In some cases, the measured optical spectrum or measured optical power by the optical measurement device can be an average optical spectrum or an average optical power, averaged over the plurality of light beams emitted by the lidar device 301 and over a period of time during which the angle (azimuthal angle with respect to Xr-axis) between the emission axis of the lidar device 301 and the Zr-axis is larger than the threshold exit angle.

Figure 4A:
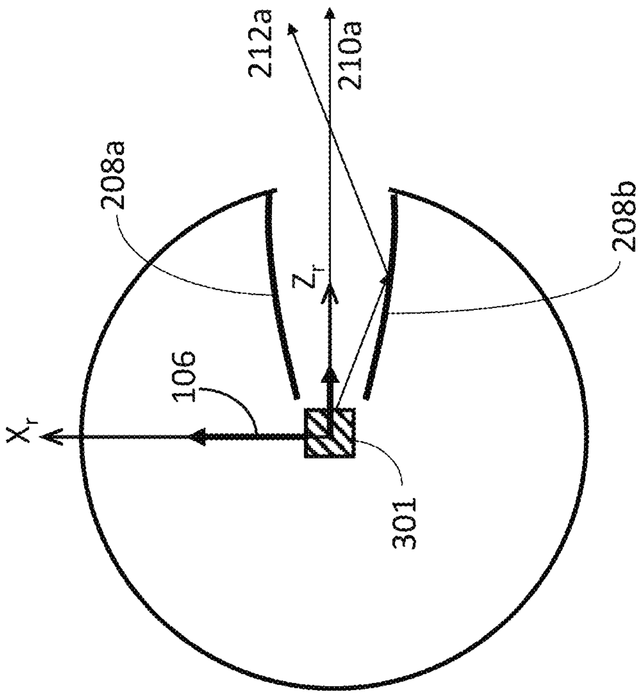
FIG. 4A is a diagram illustrating a side view cross-section of an example housing when a lidar device is in a neutral rotational position with respect to the housing.

As described above, the mechanical control stage 320 can be rotational stage usable for controlling an angle (a polar angle) between the emission axis of the lidar device 301, and the Xr-axis. In some cases, the mechanical stage 320 may be used to select one or more light beams of the plurality of the light beams emitted by the lidar device 301 such that at least during a portion of the rotational period of the lidar device 301 the selected one or more light beams directly exit the cavity via the first aperture 206 without interacting with any surface (e.g., without being reflected by any surface). FIG. 4A illustrates a side view cross-section of the housing 200 and the lidar device 301 within the housing, when the lidar device 301 is in a neutral rotational state with respect to the housing 200 (similar to FIGS. 1A and 1B) during a portion of the rotational period when the azimuthal angel between the emission axis of the lidar (e.g., emission axis 111) and the Zr-axis is larger than the threshold exit angle. As described above, in such positional and temporal state, the light beam 210*a* that propagates in a first direction with respect to the rotational axis 106 (e.g., perpendicular to the rotational axis 106), exits the cavity without being reflected while the light beam 212*a* that propagates a second direction different from the first direction exits the cavity after at least one reflection (e.g., off of the bottom optical reflector 208*b*). In some cases, the light beam 210*a* and the light beam 212*a* may be emitted by a first and a second channel of the lidar device 301 respectively. In some such cases, an angle between direction of propagation between two light beams emitted by two consecutive of neighboring channels may be referred to as polar angular inter-channel spacing. In some examples, a polar angular inter-channel spacing between a pair of adjacent channels may be substantially equal to a polar angular inter-channel spacing between another pair of adjacent channels. In some such cases, an angle between the first direction and the second direction may be substantially equal to an integer number multiplied by angular inter-channel spacing. In some examples, the polar angular inter-channel spacing for the lidar device 101 or 201 can be smaller than 1 degree, smaller than 2 degrees, or smaller than 5 degrees.

Figure 4B:
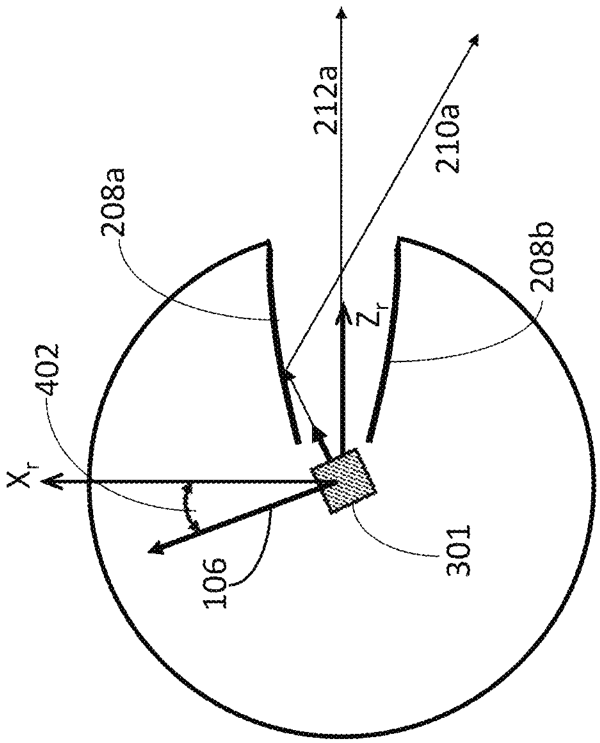
FIG. 4B is a diagram illustrating a side view cross-section of an example housing when a lidar device is rotated with respect to housing.

FIG. 4B illustrates a side view of cross-section the housing 200 and lidar device 301, where the lidar device 301 is rotated (e.g., using the mechanical control stage 320 shown in FIG. 3A) by a rotation angle (polar rotation angle) 402 with respect to the Xr-axis of the housing 200. In some cases, the rotation angle 402 may be larger or substantially equal to the polar angular spacing between the first channel and the second channel (e.g., an integer number of the angular inter-channel spacing of the lidar device 301). In some such cases, the light beam 212*a* directly exits the cavity without interacting with any surface while the light beam 210*a* is reflected at least by one optical reflector (e.g., the top optical reflector 208*a*). As such, the mechanical control stage 320 may be used to rotate the lidar device 301 such that during a portion of a rotation period, one or more selected light beams pass through the first aperture 206 without any reflection (or any interaction with an optical guard) and other light beams emitted by the lidar device 301 to be reflected at least once, before exiting the cavity.

When a light beam generated by a lidar channel directly exits the cavity (without being reflected) at least in a portion of a rotational period, the lidar channel may be referred to as a channel aligned to the first aperture 206. The mechanical control stage 320 may be used to align different channels of the lidar device 301 with the first aperture 206.

In some examples, the mechanical stage 320 may be controlled by a user. For example, a user may use a mechanical user interface (e.g., a micrometer) to rotate the lidar seat 322 and to adjust the polar angle 402. In some examples, the mechanical stage 320 may be remotely controlled via a wired or wireless link between an electronic control interface outside of cavity. For example, the mechanical stage 320 may include one or more electromechanical actuators that allow controlling the mechanical stage 320 via one or more mechanical control signals received via a wired or a wireless link. In some cases, the electronic control interface may comprise a user interface configured to allow a user to control the mechanical control stage 320. In some cases, the mechanical control signals may be generated by an electronic control system configured to execute and control a lidar test and characterization process using a lidar measurement system comprising the housing 200. In some implementations, the housing 200 may include an opening to allow a wired electronic connection between the mechanical control stage 320 and an electronic control interface.

In various implementations, a light beam that exits the cavity without interacting with any surface, may be used to test and evaluate the range finding function of the lidar channel that emits the light beams. As such, the mechanical stage 320 may be used to select a channel of the lidar device 301 whose range finding function needs to be tested. Such degree of freedom enabled by the mechanical control stage 320 and the arrangement of the optical reflectors (or optical guards) 208*a*/208*b* and the first aperture 206 in the housing 200, may be used to evaluate the performance of all channels of the lidar device 301 during a test procedure.

In some examples, range finding function of a lidar may comprise generating a lidar signal usable for estimating a distance between the lidar and a target. In some cases, evaluating the range finding function of the lidar may comprise, determining the distance between the lidar and the target. In some cases, evaluating the range finding function of the lidar may comprise, determining the distance between the lidar and the target, and further determining the accuracy of the distance estimated using the lidar signal. In some cases, evaluating the range finding function of the lidar may comprise determining one or more properties of the lidar signal such as signal-to-noise ratio, amplitude, phase noise, and other properties. In some examples, evaluating the range finding function of a lidar may comprise, estimating: the probability of detecting targets having different reflectivity's, the probability of detecting targets positioned such that light beams generated by the lidar becomes incident on them at different angles. In some cases, evaluating the range finding function of the lidar may comprise, determining the distance between the lidar and the target and determining the accuracy of the distance estimated using the lidar signal, at different temperatures and/or humidity levels. In some cases, evaluating the range finding function of the laser range finder may comprise determining the probability of false positive and/or false negative detection, and estimating a detection confidence level.

ADDITIONAL EXAMPLES

In some implementations, the housing of a lidar test and measurement system may not include optical guards separate from the internal surface of the cavity. In some such implementations, a portion of the internal surface of the cavity may comprise an optically absorptive surface configured to absorb light having a wavelength within the operational wavelength range of an LUT. Additionally, a size of the first aperture (e.g., the height and the width of a rectangular first aperture, or a diameter of a circular first aperture), may be designed such that at any moment in time no more than one light beam emitted by the LUT can pass through the aperture. In some examples, a portion of the internal surface in the vicinity of the first aperture may be an absorptive surface such when a light beam emitted by the LUT directly passes through first aperture at least a portion of the other light beams (that do not pass through the first aperture) are absorbed by the absorptive surface. In some cases, the absorptive portion of the internal surface, surrounding the first aperture, may have a shape and a size designed to minimize an area of the absorptive surface and yet absorb all light beams emitted by the LUT when at least one light beam passes through the first aperture.

Figure 5B:
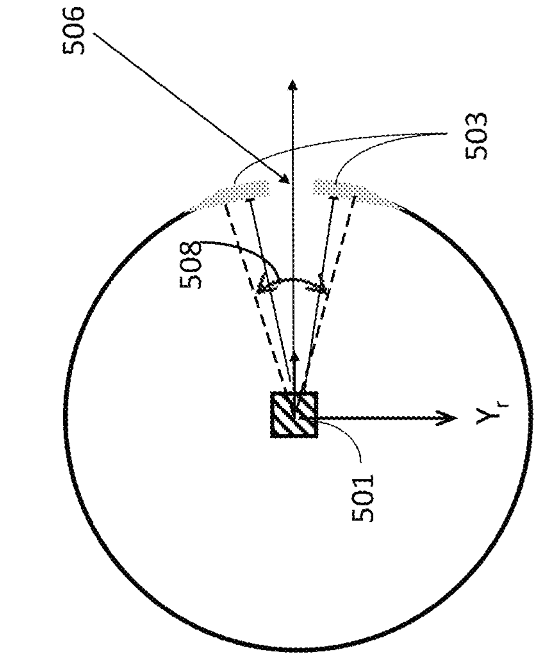
FIGS. 5A and 5B are diagrams illustrating side and top cross-sectional views of an example housing having an internal surface, where the internal surface has an absorptive region, respectively.
Figure 5A:
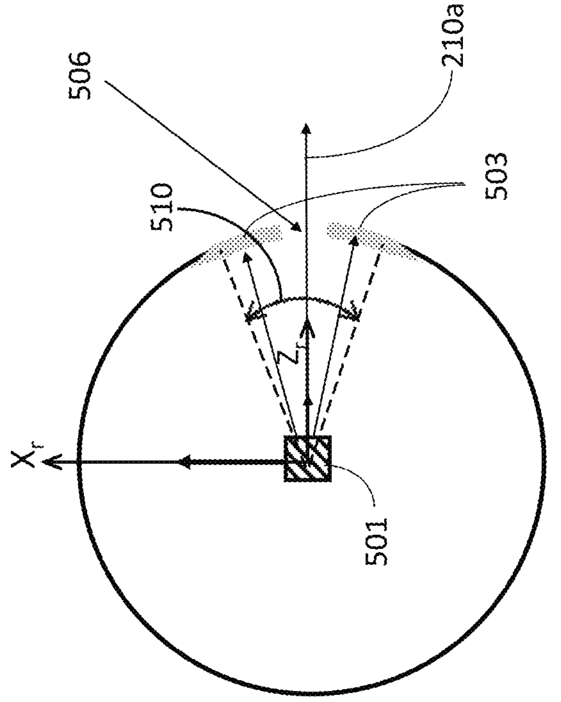

FIGS. 5A and 5B show a side cross-sectional view (in the Xr-Zr plane) and a top cross-sectional view (in the Yr-Zr plane) of a housing 500 having an internal surface that comprises an absorptive region, respectively. In the example shown, the lidar device 501 is in neutral angular position with respect to the housing 500 and the azimuthal rotational position of the lidar device 501 is such that the light beam 210*a* emitted substantially parallel to the emission axis, passes through the first aperture 506 of the housing 500. In some cases, the lidar device 501 may comprise one or more features described above with respect to the lidar devices 100 and/or 101.

The absorptive region 503 may surround the first aperture 506 and may be extended away from the edges of the first aperture 506 such that all the light beams other than the light beam 210*a* emitted by the lidar device 501, interact with the absorptive region 503. In some examples, the polar angular extension 510 of the absorptive region 503 may be equal or larger than the polar static angular range (e.g., the polar static angular range 110 of the lidar device 100 or 101) of the lidar device 501. In some examples, the azimuthal angular extension 508 of the absorptive region 503 may be equal or larger than the polar static angular range (e.g., the azimuthal static angular range 108*a* of the lidar device 100 or 101) of the lidar device 501.

In some examples, the polar angular extension 510 and the azimuthal angular extension 508 of the absorptive region 503 may be such that the surface area of the absorptive region 503 is minimized and yet light beams emitted by the lidar device 501 that make an angle larger than 2 degrees or 4 degrees with a light beam the light beam 210*a*, interact with the absorptive region 503 (e.g., are absorbed by the absorptive region 503). In some cases, when the azimuthal angle between the emission axis of the lidar 501 and the Zr axis is less than a threshold exit angle, one or more light beams emitted by a lidar channel that is aligned with the first aperture 506 may pass through the first aperture 506, while light beams emitted by all other lidar channels may be absorbed by the absorptive region 503. Similar to housing 200 shown in FIG. 3A and FIG. 3B, the housing 500 may include a rotational stage that controls a polar rotational position of the lidar 501 with respect to the Xr axis and can be used to align a lidar channel to the first aperture 506. In some cases, similar to housing 200, the housing 500 may include a second aperture that allows light beams emitted by the lidar 501 during a portion of the rotational period of the lidar 501 housing to exit the cavity and interact with a measurement device.

Example Lidar Characterization Process

In some implementations, a testing and characterization procedure of an LUT may comprise characterizing the range finding properties of selected channels of the LUT during a first portion of the rotational period of the LUT and the optical characteristics of the light beams emitted by the LUT during a second portion of the rotational period. The first and the second portions of the rotational period may be non-overlapping time intervals. In some cases, the second portion is a longer time interval than the first portion.

In some cases, the testing procedure may be manually controlled by a user. In certain cases, the testing procedure may be controlled by an electronic control system. In some cases, the testing procedure may be controlled jointly controlled by a user and an electronic control system. In some cases, the electronic system may comprise at least one processor and a non-transitory electronic storage device (e.g., a memory, or computer readable media) that is in communication with the processor. In some such examples, the electronic system may execute machine readable (or computer executable) instructions stored in the non-transitory electronic storage device to perform a lidar testing or characterization procedure.

The LUT may be placed inside a cavity formed by a housing (e.g., housing 200 in FIG. 3A) of a measurement system. As described above, during a first portion of the rotational period of the LUT a selected light beam emitted by the LUT exits the cavity without interacting with any surface. The selected light beam may be used to test and characterize the range finding properties of the lidar channel that emits the light beam. In some cases, the selected light beam or the corresponding channel of the LUT may be selected by a user or the electronic control system. For example, with reference to FIG. 3A, the user or the electronic control system may select the lidar channel by aligning the lidar channel with the first aperture 206 of the housing 200 (e.g., using the mechanical control stage 320).

In some cases, to test the range finding properties of the selected channel, a reflective target may be placed outside of the cavity in front of the first aperture 206 such that a light beam that directly exits the housing becomes incident on a reflective surface of the target and is reflected back to the LUT (e.g., the exit aperture of the LUT) without interacting with any other surface. In some such cases, the reflected light beam may be received by a receiver of the LUT associated with the lidar channel that generates light beam. In some cases, the light beam propagates from the LUT to the target 630 through a first optical path and the corresponding reflected optical beam propagates from the target 630 back to the LUT through a second optical path. In some cases, the first and the second optical paths maybe overlapping or non-overlapping parallel optical paths. In some cases, the first and the second optical paths maybe straight lines extended between the LUT and the target.

Figure 6A:
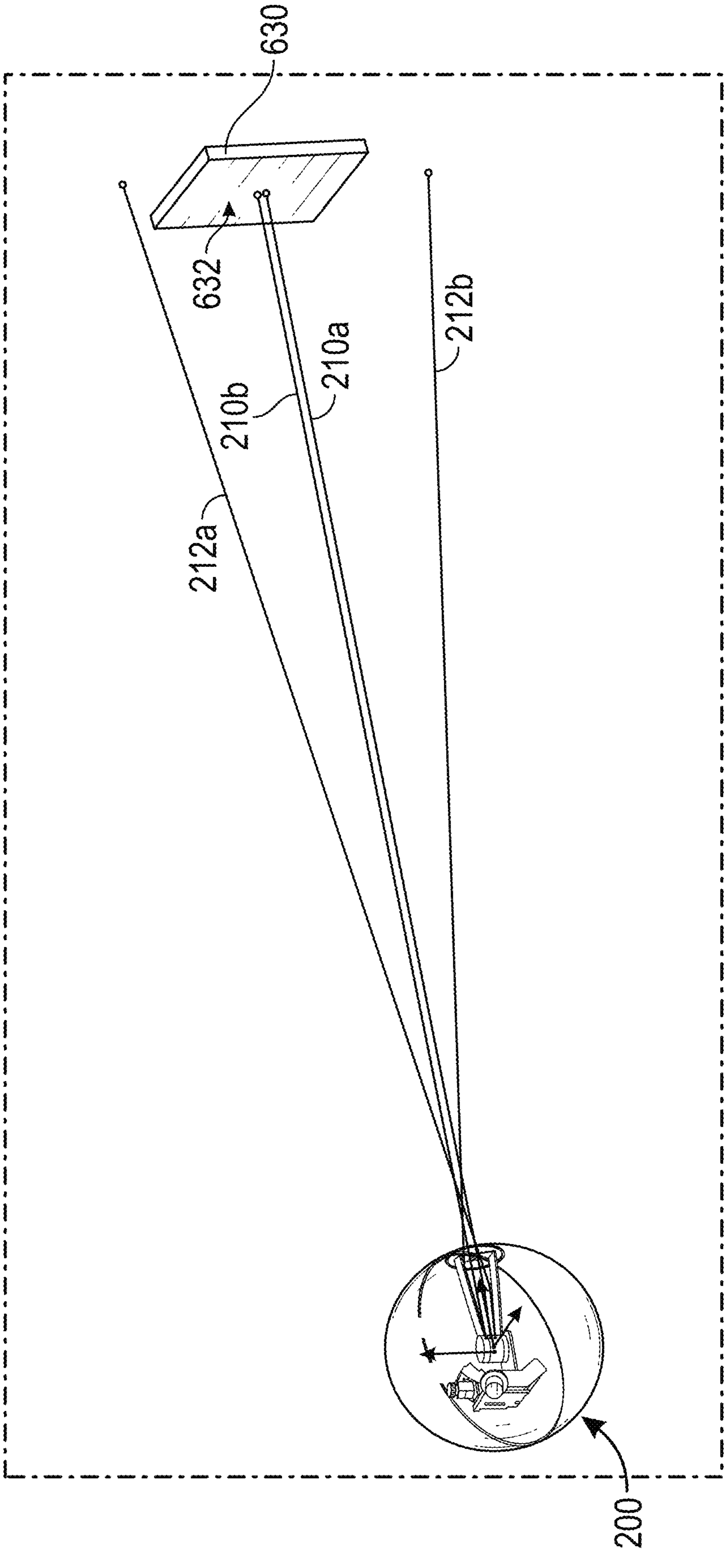
FIGS. 6A and 6B are diagrams illustrating a perspective and a side view of an example lidar measurement system comprising a housing that houses a lidar device and a reflective target placed in front of the housing for testing the range finding function of selected channels of the lidar device.
Figure 6B:
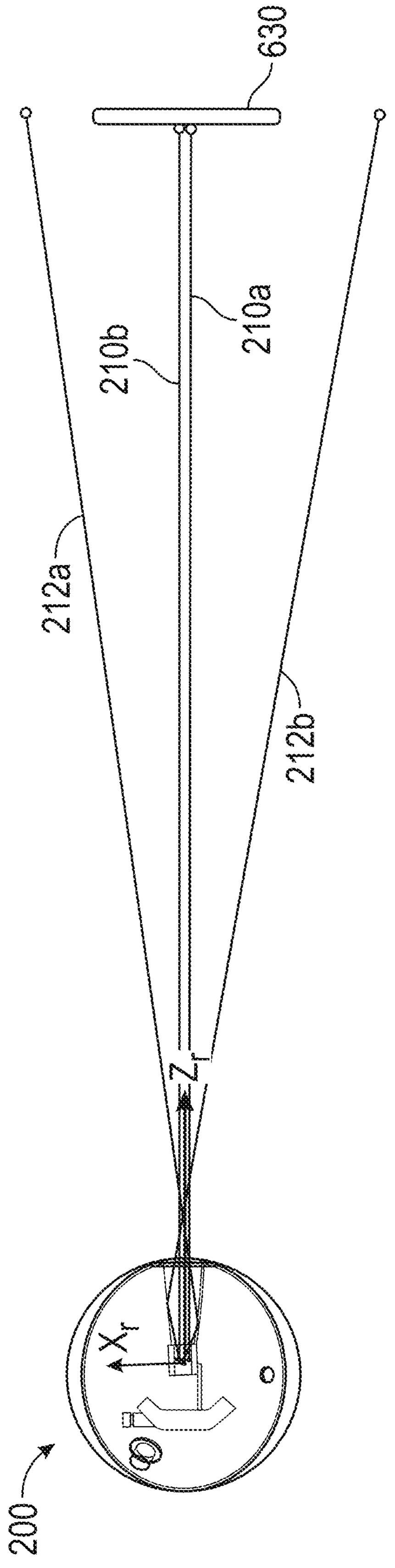

FIGS. 6A and 6B show a perspective view and a side view of an example measurement system comprising a reflective target 630 placed in front of the housing 200, respectively.

In some cases, the reflective surface 632 of the target 630 may be substantially perpendicular to the direction of propagation of a light beam (e.g., light beam 210*a*) that directly exits the housing 200. In some cases, the reflective surface 632 of the target 630 may be substantially perpendicular to Zr-axis of the housing.

In some cases, the reflective surface 632 of the target 630 can be a metallic or metal-coated surface comprising aluminum, gold, copper or other metals or metal alloys. In some cases, the reflective surface 632 of the target 630 may comprise a multilayer dielectric coating configured to reflect light having a wavelength within the operation wavelength range of the LUT. In some examples, the optical reflectivity of the reflecting surface 632 for a wavelength within operational wavelength range of the LUT can be from 1% to 10%, from 10% to 30%, 30% to 50%, 50% to 70%, 70% to 90% or smaller or larger values. In some cases, a longitudinal distance (along Zr-axis) between the reflective surface 632 of the target 630 and the housing can be from 0.1 meter to 1 meter, a meter to 50 meter, 50 meters to 100 meters, 100 meters to 150 meters, 150 meters to 200 meters, 200 meters to 400 meters or smaller or larger values. In various, implementations, the target 630 or the reflective surface 632 of the target 630 may comprise different reflective materials and different reflective properties. In some examples, the target 630 may comprise a retro reflective mirror, or a Lambertian reflector.

With continued reference to FIGS. 6A and 6B, the light beam 210*a* may be a selected light beam (or a light beam emitted by a selected channel) that directly exits the housing 200 and becomes incident on the target 630. In some cases, for a range of longitudinal distances between the housing 200 and the target 630, a size of the target 630 (e.g., the area of the target 630) may be selected such that the light beams that exit the housing 200 (the cavity of the housing 200) after at least one reflection off of an optical reflector of the housing 200, do not interact with the target 630. In the example shown in FIGS. 6A and 6B, the light beams 212*a* and 212*b* that are reflected by the bottom and top optical reflectors of the housing 200 respectively, do not interact with the target 630. In some cases, the size of the target 630 and/or a minimum longitudinal distance between the target 630 and the housing 200 may be selected based at least in part on minimum deflection angle of the housing 200. As described above, the minimum deflection angle may be a design parameter of the housing 200. As such, different housings may enable range finding tests at different minimum distances and using targets having different sizes. In some examples, an area of the reflective surface 632 of the target 630 may be larger than the spot size of a light beam incident on the target 630. As such, targets placed at larger longitudinal distances may have larger areas.

In various implementations, the target 630 may have a rectangular, square, circular, or other shapes. In some cases, the target may have a square shape with sides having a length between 0.5 and 3 meters.

In some cases, the emitted light beam 210*a* may comprise a temporal variation of a characteristic of the light beam that may be used to define a reference time to measure a delay between the reference time and detection of respective temporal variation of the optical characteristic in the corresponding reflected light beam. The optical characteristic may include optical intensity, optical phase, modulation amplitude, modulation phase, modulation frequency, and the like. For example, the LUT may be a ToF LUT and the emitted light beam 210*a* may comprise a laser pulse emitted by the LUT at a time $t_i$. The laser pulse may be reflected from the target 630 and received by an optical receiver of the LUT at a time $t_r$. The time of flight $(t_r-t_i)$ may be used to estimate the distance between the LUT and the target 630 (e.g., distance$=(t_r-t_i)\times(c/2)$, where c is the speed of light).

Upon receiving the reflected light beam, the LUT may generate a lidar signal indicative of a delay between the generation of the temporal variation in the emitted light beam and reception of the respective temporal variation in the corresponding reflected light beam.

In some implementations, the LUT placed inside the housing 200 may emit a plurality of light beams while its emission axis rotates around its rotational axis with an angular speed within an operational angular speed range of the LUT. The light beams 210*a*/210*b* may exit the housing 200 during a first portion or the rotational period each time that lidar completes one full rotation around the rotational axis. The reflected light beam resulting from the reflection of the emitted beam may be received by a receiver of the LUT during the first portion of the rotational period. As such, during each rotational period the LUT may generate at least one lidar signal. The lidar signal may be processed by an electronic system of the LUT or the electronic system that controls the measurement procedure to evaluate the range finding performance of a lidar channel that emits the light beam. In some cases, the electronic system may collect the lidar signals associated with a selected channel generated during one or more rotational periods and store them in a memory of the electronic system. Subsequently, the electronic system may generate an average distance from the target 630 and/or data representing a temporal variation of plurality distances or average distances from the target, calculated based on the measured delays. Such data may be used by a user or the electronic system to evaluate the range finding functionality of the corresponding lidar channel. This procedure may be repeated for other lidar channels by rotating the LUT such that light beams emitted by another lidar channel directly exit the housing during each rotational period.

In some cases, during a second portion of the rotational period, the light beams emitted by all the operative channels of the LUT may become incident on a sensor or sensitive element of an optical measurement device via the second aperture after one or more reflections (e.g., diffusive reflections) off of the internal surface of the cavity of the housing 200. In some cases, during the second portion of the rotational period the measurement device may continuously generate signals indicative of values of an optical parameter associated with an optical characteristic of the light beams emitted by the LUT. These signals and/or the corresponding values may be stored in the memory of the electronic system along with the corresponding measurement times or measurement time intervals. Subsequently, the electronic system may generate data comprising one or more average values of the optical parameter, averaged over a number of rotational periods. In various implementations, a number of rotational periods over which the distance from a target, or values of the optical parameters are averaged may be selected by a user or the electronic system.

In some cases, the measured value or average value of an optical parameter may be used to determine a performance of a light source of the laser range finder. For example, a temporal variation of the measured optical power or wavelength of a light beam, and/or a temporal variation of the measured average optical power or average wavelength of a plurality of light beams, may be used to determine the power and/or wavelength stability of the light source during a measurement period. In some cases, these measured temporal variations, may be used to adjust a control parameter (e.g., a supply current, or a temperature), of the light source.

In some cases, an optical characteristic of the light beams emitted by the LUT, or a distance from a target may be measured at different ambient conditions (e.g., at different temperatures or different humidity levels of the internal volume of the cavity). In some cases, an ambient condition of the internal volume of the cavity may be controlled and changed by a user and/or the electronic control system using an environmental control system as described in the next section below.

In some implementations, the measured values or average of one or more optical characteristics and/or one or more distances or average distances may be used to identify and/or modify a component or a subsystem of the LUT or adjust a parameter of the LUT. For example, if an average optical power measured via the second aperture during a number of rotational periods is below a threshold power level, a current provided to one or more light sources (e.g., lasers) of the LUT may be adjusted. Subsequently the LUT may be tested again with the adjusted currents to evaluate the impact of the current adjustment on measured average optical power. In some cases, if after adjusting the current the optical power is still low, one or more light sources may be replaced by new or other types of light sources. A similar procedure may be used to address deviation of a measured average optical spectrum from a desired optical spectrum. For example, if the deviation of an average center wavelength, determined based on light received via the second aperture, is above a threshold deviation from a target or desired wavelength, a set temperature, or a set current of the laser may be adjusted.

Figure 7:
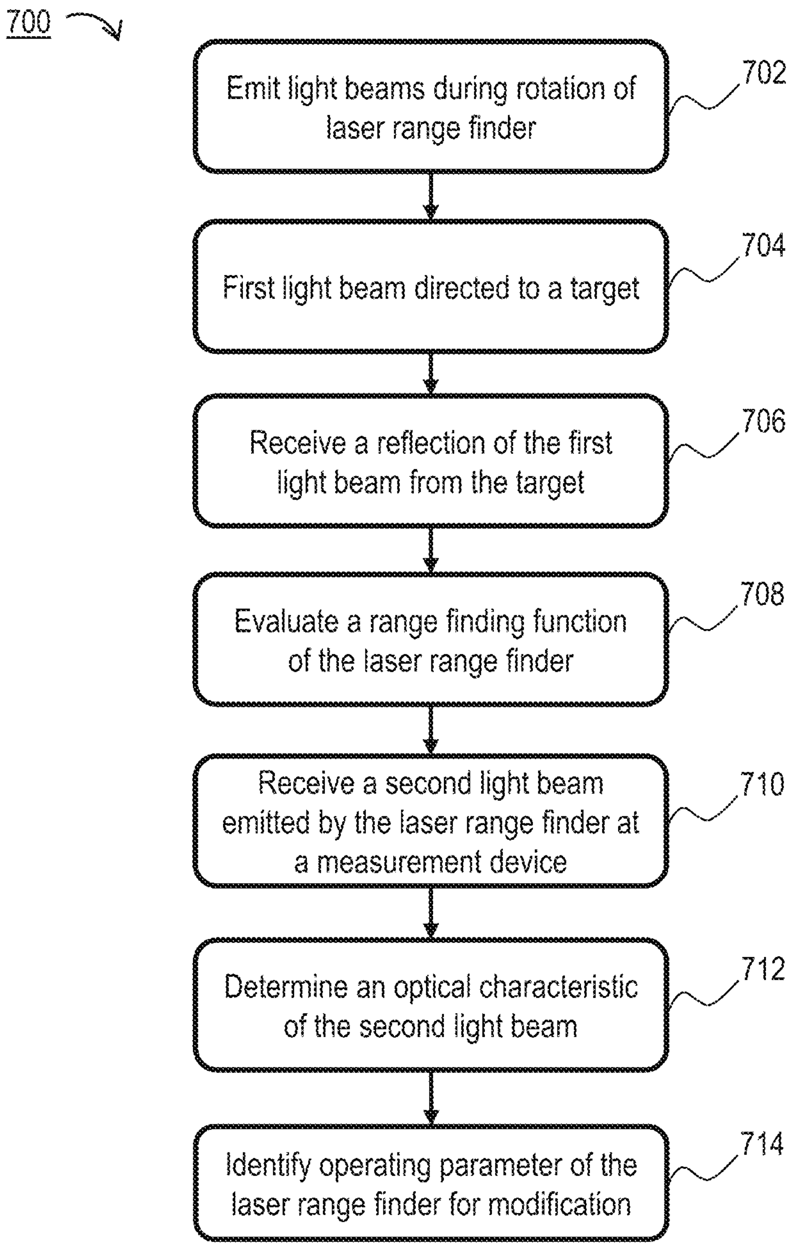
FIG. 7 is a flow diagram illustrating an example of a measurement process for determining optical characteristics of laser beams emitted by a lidar.

FIG. 7 is a flow diagram illustrating an example of a process or routine 700 implemented by one or more processors (e.g., the processor of a control system) to identify and/or modify an operating parameter of a laser range finder. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the laser range finder emits a plurality of light beams during rotation of the laser range finder about a rotational axis. In some cases, a controller or processor can cause the laser range finder to emit the plurality of light beams. As described herein, the light beams can be emitted by different channels of the laser range finder. The different channels can be arranged to emit the light beams in different directions relative to an emission axis. In some cases, each channel emits a light beam in different directions from each other relative to the emission axis. In some examples, a lidar channel may emit two or more light beams that are substantially parallel to each other. In some examples, an angle between direction of propagation of two light beams emitted by a signal channel may be less than 1 degrees, or less than 2 degrees or less than 4 degrees.

In certain cases, the laser range finder can be located within a cavity formed by a housing such that the channels emit light beams toward the interior surface of the housing. The housing and/or cavity can be any shape (e.g., spherical, oblong, ellipsoidal, parabolic, rectangular, etc.) and can include at least two apertures.

As described herein, a first aperture (also referred to herein as a target aperture) can be located on the surface of the housing and can be any shape (e.g., rectangular, polygonal, circular, oblong, elliptical, etc.). The first aperture can be positioned relative to the laser range finder to enable at least one light beam from the laser range finder to exit the cavity (towards a target) during a first portion of the rotational period of the laser range finder without being reflected, refracted (e.g., exit the cavity via the first aperture directly from the range finder).

At block 704, during at least a first portion of the rotational period of the laser range finder, at least a first light beam emitted from at a channel of the laser range finder, may be aligned with the first aperture such that the first light beam is directed to a target outside the housing through a straight optical path from the laser range finder through the first aperture and to the target.

In some cases, the housing can include a rotational stage that can move the laser range finder along an X, Y, or Z axis to align a beam from a channel with the first aperture so that the path of the first light beam from the laser range finder to the first aperture is direct (e.g., without reflecting off of the interior surface of the housing). As different channels are tested, the rotational stage can rotate to a different position to align light beams from different channels (e.g., channels different than the channel that emits the first light beam) with the first aperture. In certain cases, the system can include a temperature and/or humidity controller to control the temperature and/or humidity of the cavity during testing.

In some cases, the system directs other light beams emitted by other channels of the laser range finder, away from the target during the first portion of the rotational period. For example, the system may reflect other light beams such that they can not be reflected by the target.

In some examples, during at least a first portion of the rotational period of the laser range finder, a selected group of light beam emitted by multiple channels may exit the housing aperture through a straight optical path from the laser range finder through the first aperture and to the target without being reflected by any surface before reaching the target.

In some cases, the rotational stage may be used to align a group of light beams each emitted by a different channel from a selected group of channels, with the first aperture such that the group of light beams exit the housing without interacting with any optical guard (e.g., a reflector or an absorber). In some cases, the system directs other light beams emitted by other channels different from the first group of channels of the laser range finder, away from the target during the first portion of the rotational period.

As described herein, the system can include one or more optical guards to reflect and/or absorb light beams from the laser range finder. In some cases, the optical guards can be positioned relative to the laser range finder and the target aperture such that at least some of the light beams (e.g., some or all of the beams other than the light beam that is aligned to directly exit the cavity via the first aperture) are reflected from or absorbed by the optical guards. In instances where the optical guards reflect light beams, they can be positioned to reflect the light beams in a direction that will miss the target.

In some cases, the optical guards can be placed near the top, bottom, and/or sides of the first aperture. In certain cases, the optical guards can extend from the target aperture in a direction that is approximately perpendicular to the plane of the first aperture. In some cases, the optical guards can include an arch. In some such cases, the portion of the optical guard that is closest to the interior surface of the housing can be approximately perpendicular to the portion of the interior surface at that location.

At block 706, a system component (e.g., laser range finder) receives at least one reflected light beam reflected by the target through the first aperture. As described herein, the reflected light beam can correspond to the first light beam that exited the target aperture during the first portion of the rotational period of the laser range finder and was reflected by the target. In some cases, a system component (e.g., laser range finder) may receive multiple reflected light beams reflected by the target through the first aperture. In some cases, the reflected light beams can correspond to a group of light beam that exited the target aperture during the first portion of the rotational period of the laser range finder and were reflected by the target.

At block 708, the system evaluates a range finding function of the laser range finder based at least on one reflected light beam. In some cases, the system evaluates a range finding function of the laser range finder based on multiple reflected light beams. For example, the system may evaluate the range finding function of the laser range finder for multiple channels that emit the light beams associated with the multiple reflected light beams. In some cases, the range finding function can include generation of at least one lidar signal usable for determining a distance between the laser range finder and the target. In some such cases, evaluating the range finding function may comprise determining a distance between the laser range finder and the target using the one or more lidar signal, determining a signal-to-noise ratio of a lidar signal generated based on the reflected light beam, or determining the accuracy of a determined distance between the laser range finder and the target. In some cases, the range finding function can include generation of one or more lidar signal usable for determining a velocity of a target with respect to the laser range finder. In some such cases the evaluation of the range finding function may comprises estimating or calculating the accuracy of the determined velocity of the target. In some cases, evaluating the range finding function of the laser range finder may comprise determining the probability of false positive and/or false negative detection, and estimating a detection confidence level. In some cases, detection may include identifying the presence of a target in front of the first aperture based on a reflected light beam associated with a light beam emitted by the lidar during the first portion of its rotation al period.

At block 710, a second light beam emitted during a second portion of the rotational period of the laser range finder, is received by a measurement device. The measurement device may comprise an optical power meter, and optical spectrometry, an optical polarimetry, an optical noise measurement system, or any other measurement system that may be used to measure an optical characteristic of the second light beam.

As described herein, a second aperture (also referred to herein as the measurement aperture) can be located on the surface of the housing at a different location than the first aperture and can be any shape (e.g., rectangular, spherical, oblong, elliptical, parabolic). The second aperture can be positioned to enable any one or any combination of beams emitted by the laser range finder during a second portion of the rotational period to exit the cavity. The path of the beams that exit the cavity via the second aperture may be direct (e.g., directly from the laser range finder to the second aperture without reflection) or indirect (e.g., reflected off of the interior surface of the housing one or more times before exiting the cavity). The light beams that exit the cavity may comprise light diffusively reflected from an internal surface of the housing. In some cases, the second portion of the rotational period of the laser range finder can be greater than the first portion. For example, the first portion of the rotational period of the laser range finder can correspond to the portion of the rotational period in which the exit aperture of the laser range finder is aligned with the target aperture of the housing to allow at least one light beam from a channel to exit the cavity via the target aperture. The remaining portion of the rotational period can correspond to the second portion of the rotational period of the lase range finder.

At block 712, the system determines an optical characteristic of at least the second light beam. In some cases, the system can determine the optical characteristic using the measurement device. In some cases, the measurement device can receive or collect a plurality of light beams that exit the housing via the second aperture. The measurement device can determine one or more optical characteristics of these light beams including optical power, polarization, center wavelength, spectral properties, or other optical characteristics. In some cases, the measurement device may determine an average value of a parameter associated with an optical characteristic of the plurality of light beams, averaged over all the light beams received via the second aperture during the second portion of the rotational period including optical power.

In some cases, during the second portion of the rotational period, a plurality of light beams can be directed to exit the cavity via the second aperture. The light beams can exit the cavity (and/or be captured by the measurement device) via the second aperture directly (e.g., without being reflected off of the interior surface of the housing) and/or indirectly (e.g., after being reflected one or more times by the interior surface of the housing). For example, some of the light beams may be captured, measured and/or sensed by the measurement device along a straight optical path from the light source while others may be captured, measured and/or sensed by the measurement device after being reflected one or more times off of the internal surface of the housing. The light beams directed to the second aperture may be received by the measurement device that generates a value (e.g., an average value) of an optical parameter associated with one or more optical characteristics of the light beams.

At block 714, the system identifies an operating parameter of the laser range finder for modification based at least in part on the determined range finding function (determined at block 708 during the first portion of the rotational period), and/or an optical characteristic of one or more light beams (determined at block 712 during the second portion of the rotational period). In certain cases, the system operating parameters include any one or any combination of sensitivity, noise level, or gain of a receiver (e.g., a photoreceiver), optical power of one or more light beams, one or more control parameters of circuit or module that determines a delay between a light pulse associated with the at the least one light beam and a light pulse associated with the reflected light beam.

The process 700 can include fewer, more, or different blocks. For example, in some cases, the process can further include determining at least one optical characteristic of at least one light beam that exits the cavity via a second aperture.

In some cases, the outcomes of the range finding evaluation (generated at block 708), and/or the outcome of the optical characterization of the light beam(s) (determined at block 712), may be stored in a memory of the system as lidar characterization data. In some such cases, the a user may use the lidar characterization data to modify an operating parameter of the laser range finder.

Furthermore, the routine 700 can be repeated across multiple channels, etc. In some cases, as a channel is tested and relevant optical parameters of the laser range finder are adjusted, the rotational stage may be used to adjust the position and/or orientation of the laser range finder so that a different channel can be tested. For example, after a first channel has been tested and relevant optical parameters have been adjusted, the system may use the rotational stage to adjust the position and/or orientation of the laser range finder so that a second channel is aligned with the target aperture and can be tested, etc. The system can repeat this until some, or all of the channels have been tested and/or corresponding optical parameters of the laser range finder are adjusted. In some implementations, a user may use the rotational stage to select a different channel after a set of measurements performed on a channel by the system. After selecting the channel, the user may trigger the measurement system (e.g., via a user interface), to characterize the selected channel by performing a set of measurements on the selected channel. In some cases, the set of measurement may comprise evaluating the range finding of the corresponding channel and determine an optical characteristic of the light emitted by the laser range finder during a set measurement period.

In various implementations, a measurement system may be configured to allow a first group of light beams emitted by a selected group of channels of a laser range finder to exit the housing during a first portion of the rotational period via the first aperture without interacting with any optical guard. In some cases, one or more light beams of the first group of light beams may be reflected by a target back to the laser range finder via the first aperture. In some cases, the selected group of channels may be selected using the rotational stage placed inside eth cavity of the housing. In some cases, a number of light beams in the first group of light beams may be less than 20, less than 40, less than 60 m less than 80, or less than 100. In some cases, a number of light beams in the first group of light beams may be controlled by controlling an activation time and period of one or more channels. In some cases, an activation time may comprise a time at which a channel emits a light beam and an activation period may comprise a portion of a rotational period during which a channel emits light.

In some cases, during the routine 700 the activation time of the channels of the laser range finder under test may be controlled (e.g., by the one or more processors), to select a number of lidar channels that are tested for range finding functionality during the first portion of the rotation period of the laser range finder.

In various implementations, the number of light beams that exit the housing during a first portion of the lidar rotational period without being reflected by any optical guard, may be determined by a activation times and periods of the lidar channels and a size (e.g., an azimuthal and polar angular widths) of the first aperture.

Environmental Control

In various implementations, during the lidar testing and/or characterization procedure, a condition of the internal volume of the cavity within which the LUT is positioned may be controlled to reproduce an environmental condition around the LUT substantially similar to an environmental condition for which the LUT is designed to operate or should operate based on a standard or regulatory requirement. For example, in order to satisfy the ISO and AEC-Q requirements, the performance of a lidar may have to be characterized and evaluated when the temperature of the internal volume of the cavity changes between −40 and 85 degrees centigrade.

In some cases, one or more environmental parameters (e.g., temperature, humidity, and the like) associated with the condition of the internal volume may be controlled during a lidar characterization procedure within one or more ranges, e.g., associated with one or more standard ranges defined for a lidar system or device. In some implementations, the value of an environmental parameter may be changed continuously or stepwise from an initial value to a final value during the characterization of each lidar channel. In some cases, a single set of values for an environmental parameter may be used during characterization of all lidar channels to enable a comparison between the performance of different channels under identical environmental conditions.

In some examples, the temperature and/or humidity of the internal volume of the cavity may be controlled using an environmental control system. In some cases, the environmental control system may be part of the electronic control system that controls the lidar testing procedure. In some such cases, the electronic control system may be configured to test the lidar and collect data for evaluating the range finding function of one or more lidar channels and optical characteristics of the light beams emitted by the LUT, under a range of environmental conditions.

Figure 8:
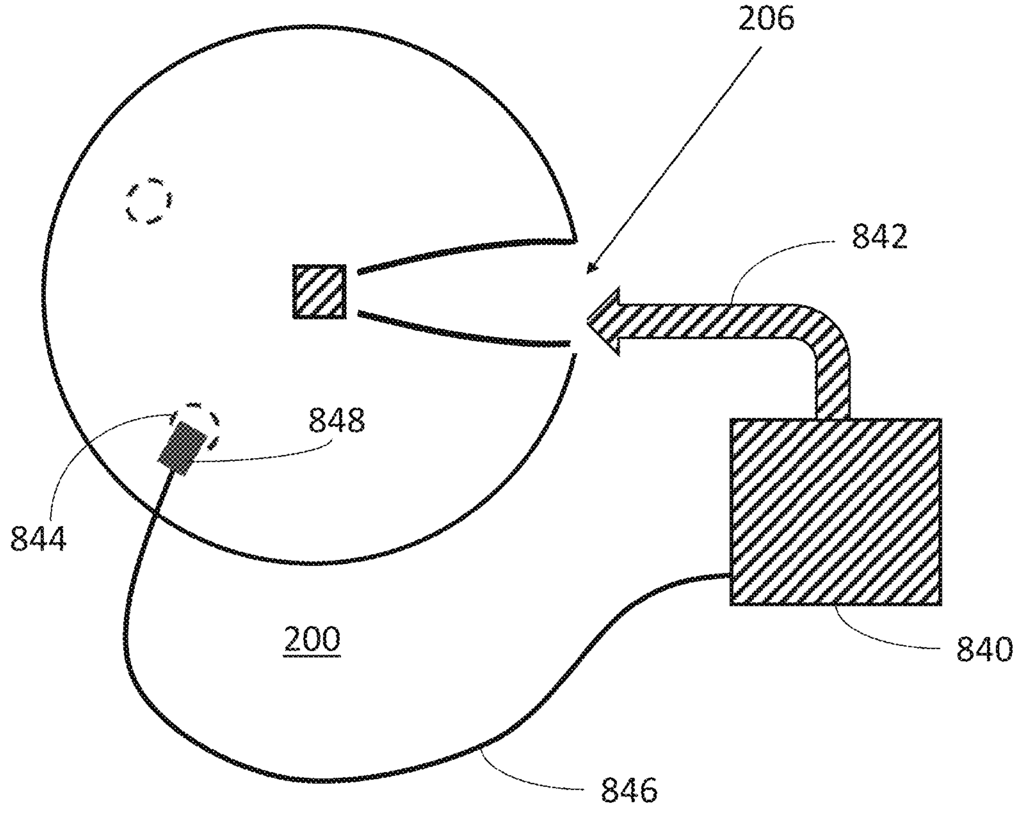
FIG. 8 is a diagram illustrating an example of a lidar measurement system comprising a housing and an environmental control system that controls a condition of the internal volume of the cavity formed by the housing.

FIG. 8 illustrates an example of a housing 200 where the internal volume of the cavity formed by the housing 200 is controlled by an environmental control system 840. In some cases, the environment control system 840 may comprise a controller, an air conditioner and/or humidity control device configured to change the humidity and/or temperature or the internal volume of the cavity. In some cases, air conditioner and/or humidity control device may generate a conditioned airflow having controlled humidity level and/or temperature. In some cases, a humidity measurement device may be used to measure the humidity level in the internal volume of the cavity and the controller may control the humidity control device based at least in part on the measured humidity in the internal volume of the cavity, to adjust the humidity in the internal volume of the cavity. In some cases, a temperature measurement device (e.g., a thermometer) may be used to measure the temperature in the internal volume of the cavity and the controller may control the air conditioner based at least in part on the measured temperature in the internal volume of the cavity, to adjust the temperature in the internal volume of the cavity. In various embodiments, the humidity level and/or the temperature of the conditioned airflow may be determined by a controller of the environmental control system or a user input. In some cases, the conditioned airflow may be transported to the cavity via the first aperture 206 of the cavity, e.g., using an air duct positioned between first aperture 206 and an output of the environmental control system 840. In some cases, the housing may have an additional opening through which conditioned air may be transported to the internal volume of the cavity, e.g., using an air duct connected to or placed near the opening.

In some implementations, the housing 200 may include yet another opening, through which the condition of the internal volume of the cavity is measured using one or more environmental sensors (e.g., temperature sensor or thermometer, humidity sensors, and the like). The environmental sensor(s) may be connected or positioned near the opening such that a sensing element or sensor elements of the environmental sensor(s), can effectively interact with the air contained in the internal volume of the cavity. An environmental sensor may communicate with the environmental control system via a wired, wireless link. In the example shown in FIG. 8, the environmental control system 840 is connected to an environmental sensor 848 that is positioned inside the opening 844, via a wired link 846. In some cases, the environmental sensor may be placed inside the cavity and the wired link may pass through the opening 844. In some cases, the environmental sensor 848 may communicate with the environmental control system 840 via a fiber optical link.

In some cases, the environmental sensor(s) may provide one or more signal sensors to the environmental control system 840 to enable a closed loop control of one or more environmental conditions of the internal volume of the cavity, during a lidar testing and characterization procedure.

In some cases, the environmental control system 840, or an electronic control system that controls the lidar testing procedure and the environmental control system 840, may be configured to change the condition in the internal volume of the cavity during different steps of the testing procedure. For example, an electronic control system may test the optical characteristics of light beams and performance of lone or more channels of the LUT at a first condition of the internal volume of the cavity and repeat the test after changing the condition of the internal volume to a second condition using the environmental control system 840. Alternatively or in addition, a user may set the condition of the internal volume of the cavity using a user interface of the electronic control system or environmental control system 840.

In some case, for each channel the routine 700 can be repeated at different conditions of the internal volume of the cavity within which the laser range finder is positioned. In these cases, the measurement system may use the environmental control system 840 to change at least one condition of the internal volume of the cavity over a predefined range when characterizing a channel of the laser range finder. For example, a first channel of the laser range finder may be characterized over a first period at a first temperature, over a second period at a second temperature, and over a third period at a third temperature.

In some implementations, the system may store the outcomes of the range finding evaluation and optical characterization at different conditions of the internal volume of the cavity. In some cases, the system or a user may use the stored outcomes to evaluate the performance of the laser range finder under various conditions. In some such cases, the evaluated performance can be compared to a set of regulatory requirements with respect to performance of lidar systems under a set of environmental conditions. In some cases, the stored outcomes may be used modify one or more operating parameters of the laser range finder.

What is claimed is:

1. A system, comprising:
   - a housing configured to house a light source within a cavity formed by the housing, wherein the housing comprises;
   - an internal surface of the cavity surrounding the light source, the internal surface configured to reflect light beams emitted by the light source,
   - a first aperture configured to enable a first at least one light beam to exit the cavity along a straight optical path from the light source passing through the first aperture, wherein the first at least one light beam is emitted by the light source during a first portion of a rotational period of the light source,
   - a second aperture configured to enable a second at least one light beam to exit the cavity, wherein the second at least one light beam is emitted by the light source during a second portion of the rotational period of the light source and reflected by the internal surface; and
   - at least one optical guard housed in the cavity and configured to interact with a third at least one light beam from the light source, wherein the third at least one light beam is emitted by the light source during the first portion of the rotational period of the light source.

2. The system of claim 1, wherein the second at least one light beam is reflected multiple times by the internal surface before exiting the cavity via the second aperture.

3. The system of claim 1, wherein the at least one optical guard comprises an optically reflective surface configured to reflect the third at least one light beam towards the first aperture.

4. The system of claim 1, wherein the at least one optical guard comprises an absorptive surface configured to absorb the third at least one light beam.

5. The system of claim 1, wherein the cavity is a spherical cavity.

6. The system of claim 1, wherein the second portion of the rotational period is longer than the first portion of the rotational period.

7. The system of claim 1, further comprising a temperature control system configured to control a temperature of an internal volume of the cavity, the temperature control system comprising:
   - a thermometer configured to measure the temperature of the internal volume of the cavity;
   - an air conditioner configured to change the temperature of the internal volume of the cavity; and
   - a controller configured to control the air conditioner based at least in part on the measured temperature of the internal volume of the cavity.

8. The system of claim 7, further comprising a humidity control system configured to control a humidity of the internal volume of the cavity, the humidity control system comprising:
   - a humidity measurement device configured to measure the humidity in the internal volume of the cavity;
   - a humidity control device configured to change the humidity in the internal volume of the cavity; and
   - a controller configured to control the humidity control device based at least in part on the measured humidity in the internal volume of the cavity.

9. The system of claim 1, wherein the first aperture extends in a longitudinal direction from a top edge to a bottom edge on the internal surface along a polar direction, and wherein the at least one optical guard is positioned proximate the top edge or the bottom edge.

10. The system of claim 1, further comprising a measurement device configured to receive the second at least one light beam through the second aperture.

11. The system of claim 10, wherein the measurement device comprises an optical spectrum analyzer configured to measure an optical spectrum of the second at least one light beam.

12. The system of claim 10, wherein the measurement device comprises an optical power meter configured to measure an average optical power of light emitted by the light source during the second portion of the rotational period.

13. The system of claim 1, wherein the light source, is configured to emit light at different rotational positions with respect to a rotational axis, and wherein at a particular rotational position the light source emits a plurality of light beams at different directions about an emission axis perpendicular to the rotational axis.

14. The system of claim 13, wherein the light source comprises a laser range finder, and the light source is further configured to receive reflected light beams associated with the plurality of light beams.

15. The system of claim 14, wherein the reflected light beams are received from an object exterior to the cavity, wherein the object is configured to reflect the first at least one light beam towards the first aperture.

16. The system of claim 15, wherein the light source is configured to receive reflection of the first at least one light beam from the object via a direct optical path passing through the first aperture, during the first portion of the rotational period.

17. The system of claim 16, wherein the light source does not receive light associated with the third at least one light beam.

18. The system of claim 13, wherein the plurality of light beams are emitted by a plurality of channels of the light source, and wherein the first at least one light beam is emitted by a selected channel of the plurality of channels.

19. The system of claim 18, wherein the system comprises a rotational stage positioned inside the cavity, wherein the light source is mounted on the rotational stage and the rotational stage is configured to rotate the light source around a channel selection axis perpendicular to the rotational axis.

20. The system of claim 19, wherein the rotational stage is further configured to align the first at least one light beam with the first aperture to allow the first at least one light beam to directly exit the cavity through the first aperture.

21. The system of claim 19, wherein the selected channel is selected using the rotational stage.

22. The system of claim 1, wherein the internal surface comprises a diffuse reflective surface.

23. The system of claim 22, wherein the second at least one light beam is diffusively reflected by the internal surface.

* * * * *